(12) United States Patent
Sugiya et al.

(10) Patent No.: US 10,226,967 B2
(45) Date of Patent: Mar. 12, 2019

(54) AIRLESS TIRE

(71) Applicant: SUMITOMO RUBBER INDUSTRIES LTD., Kobe-shi (JP)

(72) Inventors: Makoto Sugiya, Kobe (JP); Wako Iwamura, Kobe (JP)

(73) Assignee: SUMITOMO RUBBER INDUSTRIES LTD., Kobe-shi (JP)

(*) Notice: Subject to any disclaimer, the term of this patent is extended or adjusted under 35 U.S.C. 154(b) by 0 days.

(21) Appl. No.: 15/062,640

(22) Filed: Mar. 7, 2016

(65) Prior Publication Data

US 2016/0257170 A1 Sep. 8, 2016

(30) Foreign Application Priority Data

Mar. 5, 2015 (JP) .................. 2015-043964
Jun. 1, 2015 (JP) .................. 2015-111265

(51) Int. Cl.
*B60C 7/14* (2006.01)
*B60C 11/00* (2006.01)
(Continued)

(52) U.S. Cl.
CPC ........ *B60C 11/0008* (2013.01); *B60C 1/0016* (2013.01); *B60C 7/10* (2013.01);
(Continued)

(58) Field of Classification Search
CPC .. B60C 7/102; B60C 7/10; B60C 7/22; B60C 7/28; B60C 11/0008; B60C 11/0041;
(Continued)

(56) References Cited

U.S. PATENT DOCUMENTS 4,235,270 A * 11/1980 Kahaner ................... B60B 9/12
152/326
4,444,236 A * 4/1984 Kan ....................... B60C 1/0016
152/209.5

(Continued)

FOREIGN PATENT DOCUMENTS

EP 0524002 A1 * 1/1993 ............. B60C 7/102
GB 2051699 A * 1/1981 ............. A01F 15/07
JP 2008-260514 A 10/2008

*Primary Examiner* — Kip T Kotter
*Assistant Examiner* — Scott A Browne
(74) *Attorney, Agent, or Firm* — Oblon, McClelland, Maier & Neustadt, L.L.P.

(57) ABSTRACT

An airless tire includes a tread ring having a cylindrical form and a ground contact surface, a hub positioned on radial direction inner side of the tread ring and formed to be fixed to an axle, and a spoke structure connecting the tread ring and hub. The tread ring includes a tread rubber layer forming the ground contact surface, and a reinforcing rubber layer formed on tire radial direction inner side of the tread layer, and the reinforcing layer is formed of a rubber material obtained by co-crosslinking a rubber composition including a rubber component, an α, β-unsaturated carboxylic acid metal salt and a peroxide such that the metal salt has amount in range of 10 to 80 parts by weight with respect to 100 parts by mass of the rubber component and the rubber component has content rate of butadiene rubber in range of 10 to 100% by mass.

20 Claims, 12 Drawing Sheets

(51) Int. Cl.
  *B60C 1/00* (2006.01)
  *C08K 5/09* (2006.01)
  *C08K 5/14* (2006.01)
  *B60C 7/10* (2006.01)
  *B60C 9/20* (2006.01)
  *B60C 9/18* (2006.01)

(52) U.S. Cl.
  CPC .............. *B60C 7/102* (2013.01); *B60C 7/14* (2013.01); *B60C 9/2009* (2013.01); *B60C 11/0041* (2013.01); *C08K 5/09* (2013.01); *C08K 5/14* (2013.01); *B60C 2001/0066* (2013.01); *B60C 2001/0075* (2013.01); *B60C 2007/146* (2013.01); *B60C 2009/1871* (2013.01); *B60C 2011/0025* (2013.01); *B60C 2011/0033* (2013.01)

(58) Field of Classification Search
  CPC ........... B60C 7/14; B60C 1/0016; C08K 7/14; C08K 5/09
  See application file for complete search history.

(56) References Cited

U.S. PATENT DOCUMENTS

| | | | |
|---|---|---|---|
| 6,328,840 B1* | 12/2001 | Takano | B29C 66/73941 156/137 |
| 6,701,987 B1* | 3/2004 | Abbott | B60C 9/18 152/196 |
| 8,080,603 B2* | 12/2011 | Bergman | B60C 1/0016 524/394 |
| 8,104,524 B2* | 1/2012 | Manesh | B60B 9/00 152/301 |
| 2009/0071584 A1* | 3/2009 | Zhang | B60C 1/0016 152/209.5 |

* cited by examiner

AIRLESS TIRE

CROSS-REFERENCE TO RELATED APPLICATIONS

The present application is based upon and claims the benefit of priority to Japanese Patent Applications No. 2015-043964, filed Mar. 5, 2015, and No. 2015-111265, filed Jun. 1, 2015. The entire contents of these applications are incorporated herein by reference.

BACKGROUND OF THE INVENTION

Field of the Invention

The present invention relates to an airless tire which reduces a rolling resistance while ensuring excellent steering stability. The present invention also relates to an airless tire which reduces a rolling resistance and improves durability while ensuring excellent steering stability.

Description of Background Art

Japanese Patent Laid-Open Publication No. 2008-260514 describes an airless tire having a structure in which a cylindrical tread ring and a hub are connected by spoke plates—the cylindrical tread ring has a ground contact surface, the hub is fixed to an axle, and the spoke plates are radially arranged. The entire contents of this publication are incorporated herein by reference.

SUMMARY OF THE INVENTION

According to one aspect of the present invention, an airless tire includes a tread ring having a cylindrical form and a ground contact surface, a hub positioned on a radial direction inner side of the tread ring and formed to be fixed to an axle, and a spoke structure formed such that the spoke structure is connecting the tread ring and the hub. The tread ring includes a tread rubber layer forming the ground contact surface, and a reinforcing rubber layer formed on a tire radial direction inner side of the tread rubber layer, and the reinforcing rubber layer is formed of a rubber material obtained by co-crosslinking a rubber composition including a rubber component, an α, β-unsaturated carboxylic acid metal salt and a peroxide such that the α, β-unsaturated carboxylic acid metal salt has an amount in a range of 10 parts by weight to 80 parts by weight with respect to 100 parts by mass of the rubber component and that the rubber component has a content rate of butadiene rubber in a range of 10% by mass to 100% by mass.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
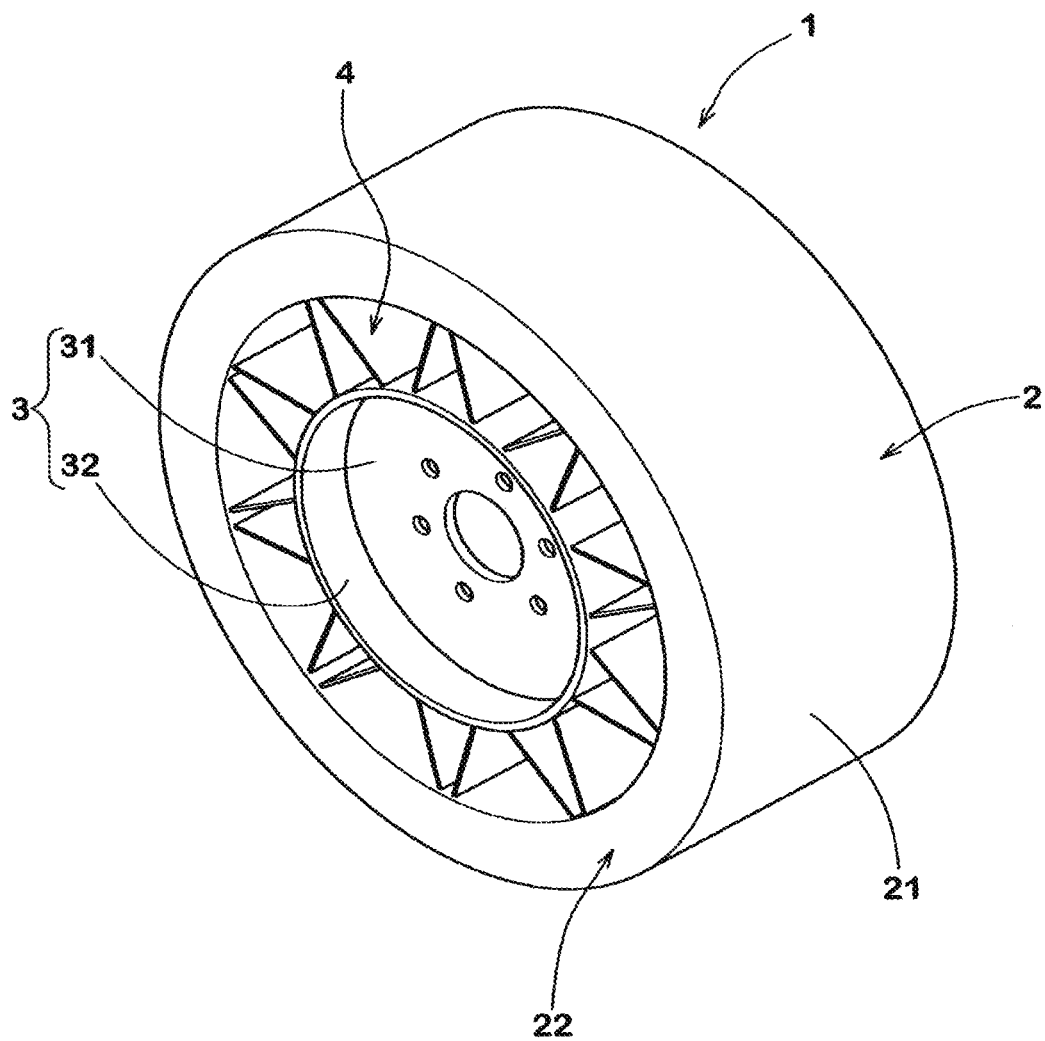
FIG. 1 is a perspective view illustrating an airless tire according to an embodiment of the present invention.

The embodiments will now be described with reference to the accompanying drawings, wherein like reference numerals designate corresponding or identical elements throughout the various drawings.

First Embodiment

As illustrated in FIG. 1, an airless tire 1 of the present embodiment includes a cylindrical tread ring 2 that has a ground contact surface 21, a hub 3 that is positioned on a radial direction inner side of the tread ring 2 and is fixed to an axle, and a spoke 4 that connects the tread ring 2 and the hub 3. The present embodiment illustrates a case where the airless tire 1 is formed as a passenger car tire.

The hub 3 has a disc part 31 that is fixed to the axle, and a cylindrical part 32 that is formed on an outer periphery of the disc part 31. The hub 3 is formed using a metal material such as steel, aluminum alloy or magnesium alloy.

The spoke 4 is formed by a cast-molded body using a polymer material. The spoke 4 has a plate-like shape. Multiple spokes 4 are provided along a tire circumferential direction.

Figure 2:
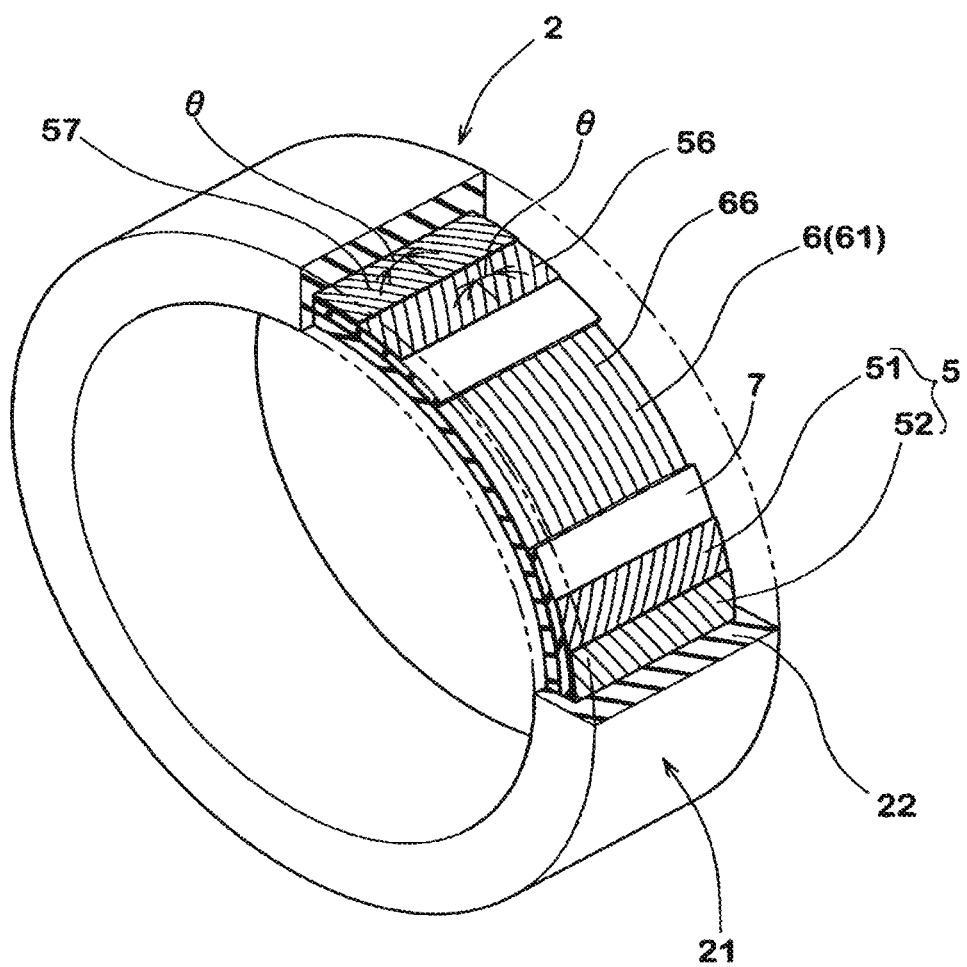
FIG. 2 is a perspective view illustrating a tread ring of FIG. 1.
Figure 3:
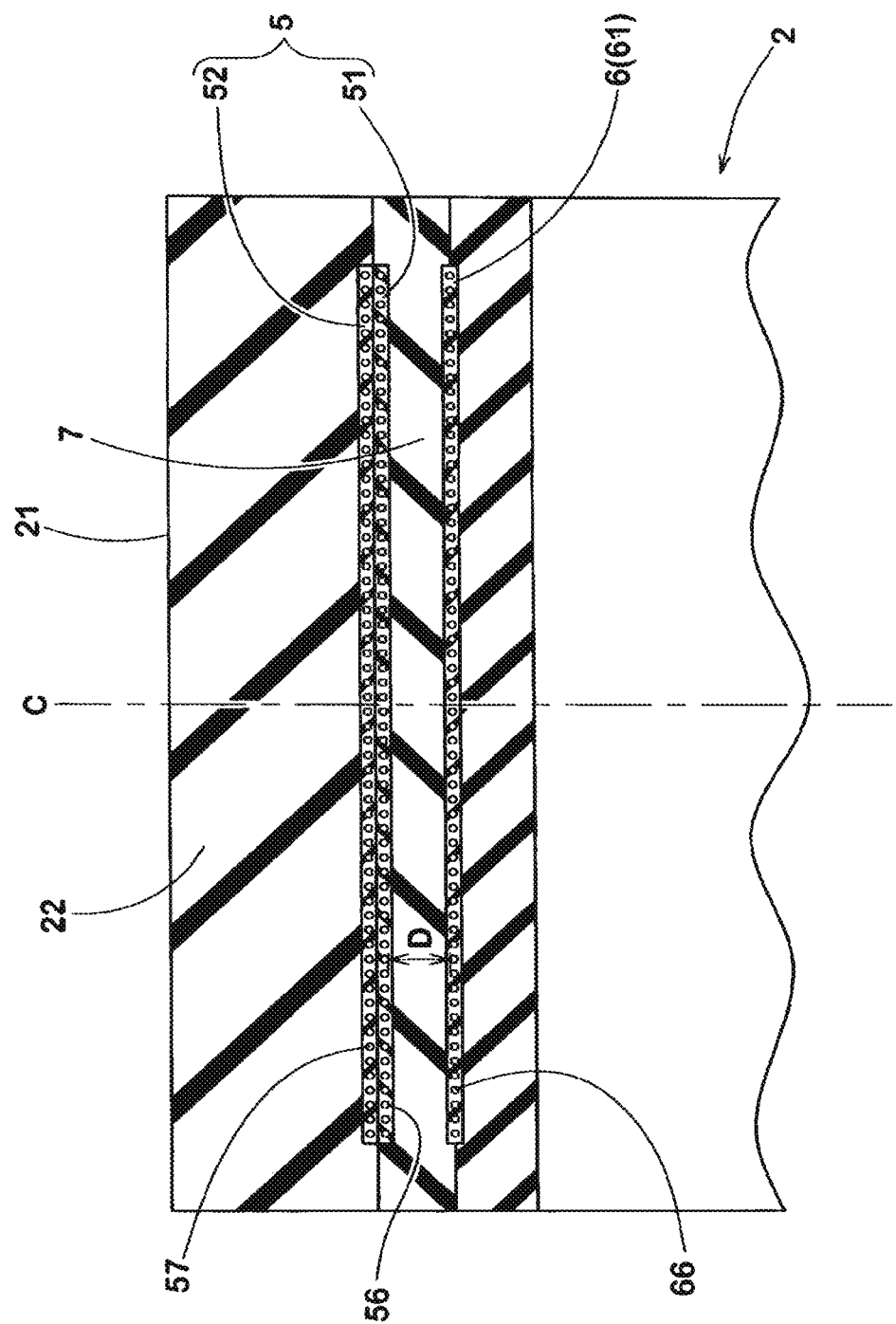
FIG. 3 is a cross-sectional view of the tread ring of FIG. 2.

As illustrated in FIGS. 2 and 3, the tread ring 2 includes a tread rubber layer 22 that forms the ground contact surface 21, and a reinforcing rubber layer 7 that is formed on a tire radial direction inner side of the tread rubber layer 22. In the present embodiment, the tread ring 2 further includes an outer side reinforcing cord layer 5 that is provided closest to the tread rubber layer 22, and an inner side reinforcing cord layer 6 that is provided on a tire radial direction inner side of the outer side reinforcing cord layer 5, and the reinforcing rubber layer 7 is provided between the outer side reinforcing cord layer 5 and the inner side reinforcing cord layer 6. That is, a sandwich structure is formed in which the reinforcing rubber layer 7 is sandwiched on both sides by the outer side reinforcing cord layer 5 and the inner side reinforcing cord layer 6.

On the ground contact surface 21, which is an outer peripheral surface of the tread ring 2, tread grooves (not illustrated in the drawings) are formed in various pattern shapes in order to impart wet performance. A rubber composition that is superior in frictional force and wear resistance with respect to making contact with the ground is preferably adopted for the tread rubber layer 22.

In the present embodiment, the number of layers in the outer side reinforcing cord layer 5 is greater than the number of layers in the inner side reinforcing cord layer 6 on the inner side. Thereby, rigidity of the ground contact surface 21 can be easily increased. Further, on the other hand, the number of layers in the inner side reinforcing cord layer 6 is less than the number of layers in the outer side reinforcing cord layer 5. Thereby, reduction in weight can be easily achieved.

The outer side reinforcing cord layer 5 is structured to include a first cord ply 51 and a second cord ply 52 that is provided on the tire radial direction outer side of the first cord ply 51.

In the present embodiment, in a tire axial direction, a width of the first cord ply 51 and a width of the second cord ply 52 are set substantially equal. "Substantially equal" includes a case where the width of the first cord ply 51 and the width of the second cord ply 52 are the same and a case where a difference between the widths is 10 mm or less.

The first cord ply 51 has first reinforcing cords 56 that are arrayed inclined at an angle (θ) with respect to the tire circumferential direction. The first reinforcing cords 56 are covered by a topping rubber.

The second cord ply 52 has second reinforcing cords 57 that are arrayed inclined at the same angle (θ) but in an opposite orientation as the first reinforcing cords 56 with respect to the tire circumferential direction. The second reinforcing cords 57 are covered by a topping rubber.

As the first reinforcing cords 56 and the second reinforcing cords 57, materials same as belt cords of a pneumatic tire, such as steel cords, may be preferably adopted. However, high modulus organic fiber cords such as aramid, polyethylene naphthalate (PEN) and polyethylene terephthalate (PET), having a high strength and a high elastic modulus, may also be used upon request.

The first reinforcing cords 56 and the second reinforcing cords 57 are positioned inclined in mutually opposite orientations with respect to the tire circumferential direction. Thereby, rigidity of the outer side reinforcing cord layer 5 is increased and the tread ring 2 is effectively reinforced. Further, when a slip angle is applied to the airless tire 1, similar to a belt cord reinforcing layer of a pneumatic tire, the outer side reinforcing cord layer 5 exhibits high resistance to an in-plane torsion, and provides excellent turning performance such as generating a cornering power.

The inner side reinforcing cord layer 6 is structured to include a third cord ply 61 that has third reinforcing cords 66. The third reinforcing cords 66 are covered by a topping rubber.

The third reinforcing cords 66 of the present embodiment are arrayed parallel to the tire circumferential direction. Here, "parallel to the tire circumferential direction" means that the array of the third reinforcing cords 66 is substantially parallel to the tire circumferential direction. Taking into account tolerances in manufacturing, an angle (θ3) of the third reinforcing cords 66 with respect to the tire circumferential direction is, for example, about 0±5 degrees. As the third reinforcing cords 66, for example, steel cords may be preferably adopted. However, high modulus organic fiber cords such as aramid, polyethylene naphthalate (PEN) and polyethylene terephthalate (PET) may also be used upon request.

Due to the third reinforcing cords 66 that are arrayed in the inner side reinforcing cord layer 6, rigidity of the tread ring 2 in the tire circumferential direction is increased. As a result, a shape of the ground contact surface 21 is stable during deceleration and acceleration, and brake performance and traction performance are improved. Further, the third cord ply 61 having the third reinforcing cords 66 that are arrayed parallel to the tire circumferential direction can ensure symmetry with respect to a tire circumferential direction line, while allowing reduction in weight to be achieved by being a single-layer layer.

Figure 4:
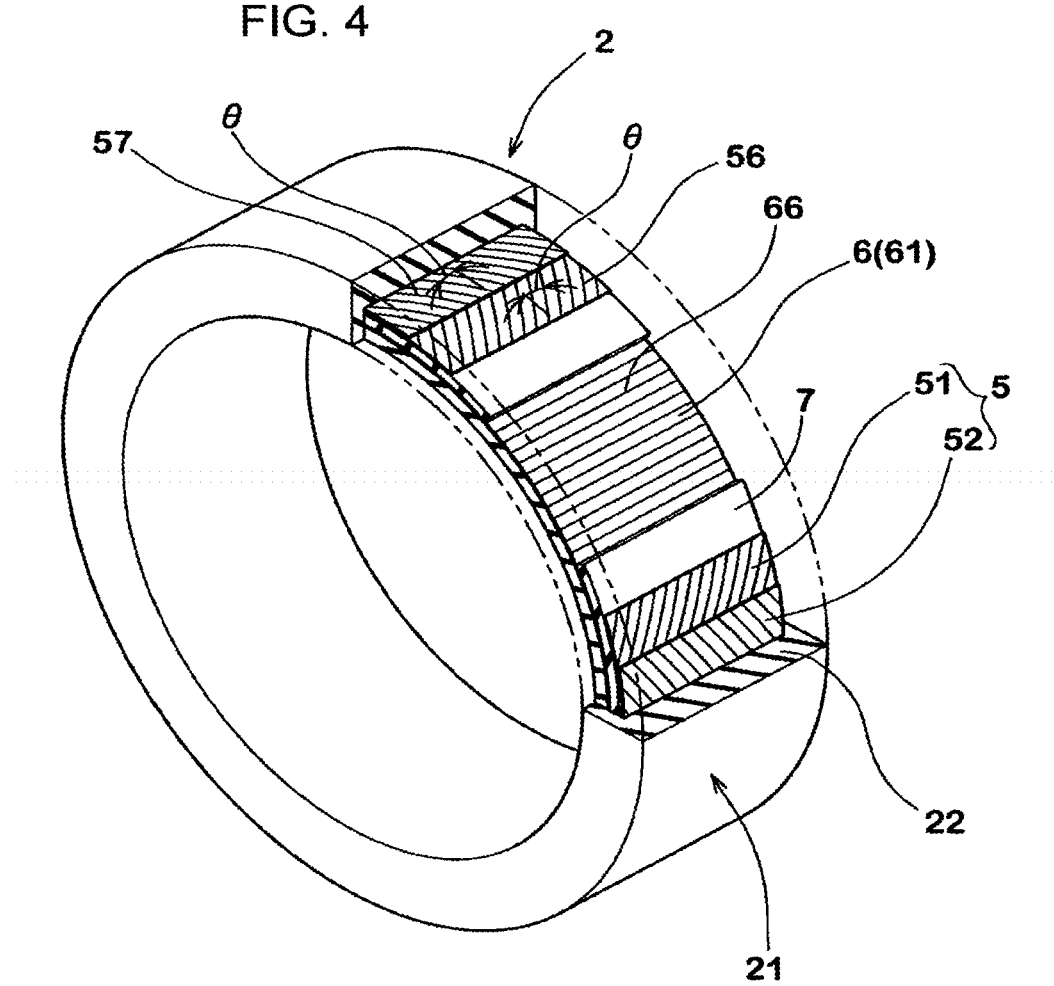
FIG. 4 is a perspective view illustrating an inner side reinforcing cord layer according to a modified embodiment of FIG. 2.

FIG. 4 illustrates another embodiment of the third cord ply 61. As illustrated in FIG. 4, the third reinforcing cords 66 may also be arrayed parallel to the tire axial direction. Here, "parallel to the tire axial direction" means that the array of the third reinforcing cords 66 is substantially parallel to the tire axial direction. Taking into account tolerances in manufacturing, the angle (θ3) of the third reinforcing cords 66 with respect to the tire circumferential direction is, for example, about 90±5 degrees.

Due to the third reinforcing cords 66 that are arrayed parallel to the tire axial direction, rigidity of the tread ring 2 in the tire axial direction is increased. As a result, when a large slip angle is applied to the airless tire 1, the shape of the ground contact surface 21 is stable and steering stability is improved. Further, the third cord ply 61 having the third reinforcing cords 66 that are arrayed parallel to the tire axial direction can ensure the symmetry with respect to the tire circumferential direction line, while allowing reduction in weight to be achieved by being a single-layer layer.

Here, for each of the outer side reinforcing cord layer 5 and the inner side reinforcing cord layer 6, the symmetry with respect to the tire circumferential direction line is important. In a case where there is no symmetry, when a load is loaded, due to torsion due to the outer side reinforcing cord layer 5 and the inner side reinforcing cord layer 6, the tread ring 22 deforms by distortion, causing a result that smooth rolling is difficult.

In a pneumatic tire, in order to suppress expansion of a tread part due to internal pressure filling, in general, an angle of belt cords with respect to the tire circumferential direction is limited to a desired range. On the other hand, in the airless tire 1 of the present embodiment, there is no need to consider internal pressure filling. Therefore, the angle (θ) of the first and second reinforcing cords (56, 57) can be set in a wide range. Specifically, it is desirable that the angle (θ) be 5-85 degrees. When the angle (θ) is less than 5 degrees, the rigidity of the tread ring 2 in the tire axial direction is insufficient, and there is a risk that turning performance may be adversely affected. On the other hand, when the angle (θ) exceeds 85 degrees, the rigidity of the tread ring 2 in the tire circumferential direction is insufficient, and there is a risk that straight travel performance, or turning performance at a small slip angle, may be adversely affected.

In the present embodiment, the case is illustrated where, in the outer side reinforcing cord layer 5, the first cord ply 51 is formed on the tire radial direction innermost side. However, it is also possible that at least one cord ply is provided on a further tire radial direction inner side than the first cord ply 51. In the present embodiment, the case is illustrated where, in the outer side reinforcing cord layer 5, the second cord ply 52 is formed on the tire radial direction outermost side. However, it is also possible that at least one cord ply is provided on a further tire radial direction outer side than the second cord ply 52. Such cord plies reinforce the tread ring 2 and improve load bearing capability of the airless tire 1, and thus are preferably adopted in tires for large loads such as tires for commercial vehicles.

Figure 5:
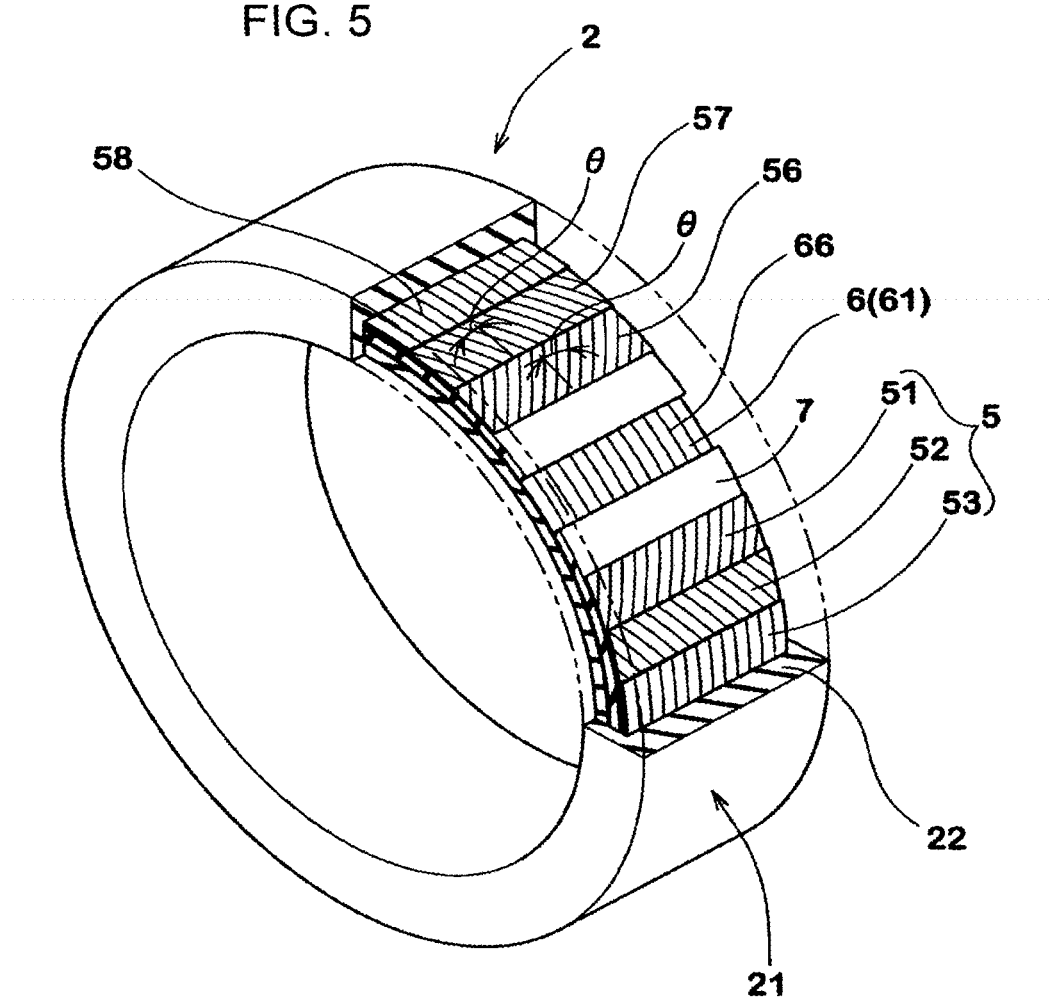
FIG. 5 is a perspective view illustrating an outer side reinforcing cord layer according to a modified embodiment of FIG. 2.

Specifically, in an embodiment illustrated in FIG. 5, the outer side reinforcing cord layer 5 is structured to further include a fourth cord ply 53, in which fourth reinforcing cords 58 are arrayed, on the tire radial direction outer side of the second cord ply 52. Other structures that are not described using FIG. 5 are the same as those in the previous embodiment.

The fourth reinforcing cords 58 are arrayed parallel to the tire circumferential direction (that is, similar to the third reinforcing cords 66, an angle ($\theta 4$) with respect to the tire circumferential direction is 0±5 degrees). Such fourth reinforcing cords 58 increase the rigidity of the tread ring 2 in the tire circumferential direction. As a result, a shape of the ground contact surface 21 is stable during deceleration and acceleration, and brake performance and traction performance are improved. Further, the fourth cord ply 53 having the fourth reinforcing cords 58 that are arrayed parallel to the tire circumferential direction can ensure the symmetry with respect to the tire circumferential direction line, while allowing reduction in weight to be achieved by being a single-layer layer.

It is preferable that an elastic modulus (E4) of the fourth reinforcing cords 58 be equal to or less than an elastic modulus (E0) of the first and second reinforcing cords (56, 57). When the elastic modulus (E4) of the fourth reinforcing cords 58 exceeds the elastic modulus (E0), the fourth cord ply 53 becomes a working ply and, when a slip angle is applied to the airless tire 1, a sufficient cornering power cannot be generated and the turning performance is adversely affected. For the fourth reinforcing cords 58, organic fibers such as nylon may be preferably adopted.

Figure 6:
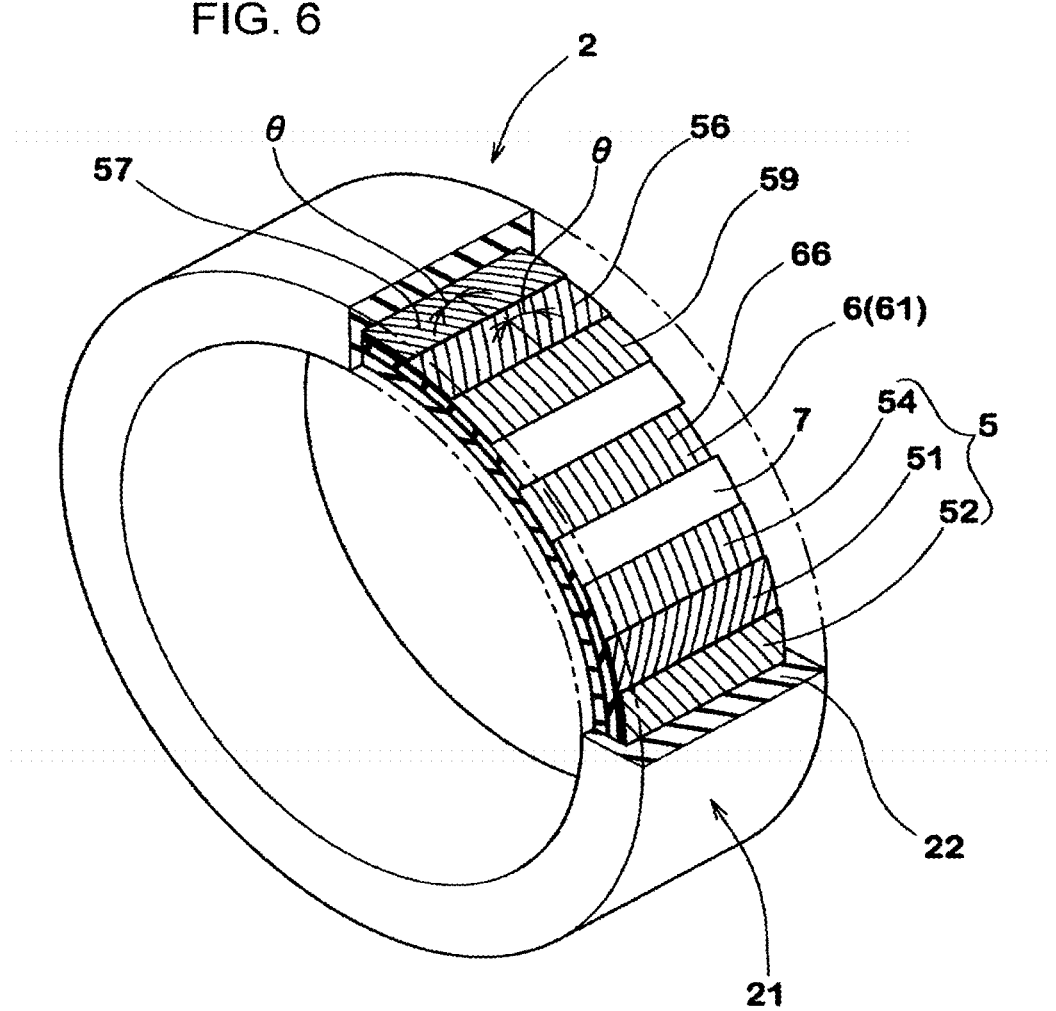
FIG. 6 is a perspective view illustrating an outer side reinforcing cord layer according to another modified embodiment of FIG. 2.

FIG. 6 illustrates yet another embodiment of the outer side reinforcing cord layer 5. Other structures that are not described here are the same as those in the previous embodiment. In the embodiment illustrated in FIG. 6, the outer side reinforcing cord layer 5 is structured to further include a fifth cord ply 54, in which fifth reinforcing cords 59 are arrayed, on the tire radial direction inner side of the first cord ply 51.

The fifth reinforcing cords 59 are arrayed parallel to the tire circumferential direction (that is, similar to the third reinforcing cords 66, an angle ($\theta 5$) with respect to the tire circumferential direction is 0±5 degrees). Such fifth reinforcing cords 59 increase the rigidity of the tread ring 2 in the tire circumferential direction. As a result, a shape of the ground contact surface 21 is stable during deceleration and acceleration, and brake performance and traction performance are improved. Further, the fifth cord layer 54 having the fifth reinforcing cords 59 that are arrayed parallel to the tire circumferential direction can ensure the symmetry with respect to the tire circumferential direction line, while allowing reduction in weight to be achieved by being a single-layer layer.

It is also possible to have a structure in which the embodiment of FIG. 5 and the embodiment of FIG. 6 are combined, that is, in the outer side reinforcing cord layer 5, the fourth cord ply 53 is provided on the tire radial direction outer side of the second cord ply 52, and the fifth cord ply 54 is provided on the tire radial direction inner side of the first cord ply 51.

Next, in the tread ring 2, the sandwich structure is formed by the outer side reinforcing cord layer 5, the inner side reinforcing cord layer 6, and the reinforcing rubber layer 7 that is formed between the outer side reinforcing cord layer 5 and the inner side reinforcing cord layer 6. As a result, forces of tension and compression that act when the tread ring 2 receives a load can be supported by the outer side reinforcing cord layer 5 and the inner side reinforcing cord layer 6 on both sides of the reinforcing rubber layer 7, and deformation of the tread ring 2 can be suppressed.

To that end, it is preferable that a tire radial direction distance (D) (illustrated in FIG. 3) between the reinforcing cords that are arrayed on the tire radial direction innermost side among the reinforcing cords of the outer side reinforcing cord layer 5 and the reinforcing cords that are arrayed on the tire radial direction outermost side among the reinforcing cords of the inner side reinforcing cord layer 6 be 3 mm or greater. In particular, it is more preferable that the reinforcing rubber layer 7 have a thickness of 3 mm or greater.

Further, in order to sufficiently enhance the above-described functions to ensure more excellent steering stability and to reduce rolling resistance, the following rubber composition (A) is used.

The rubber composition (A) contains 10-80 parts by weight of an $\alpha$, $\beta$-unsaturated carboxylic acid metal salt with respect to 100 parts by mass of a rubber component of which a content rate of a butadiene rubber (BR) is 10-100% by mass, and contains a peroxide. In the rubber composition (A), the butadiene rubber (BR) and the $\alpha$, $\beta$-unsaturated carboxylic acid metal salt co-crosslink with each other with the peroxide as an initiator, and thereby, high elasticity and low heat generation, which are difficult to achieve in a conventional rubber material of a pneumatic tire, are achieved. In particular, by using the rubber composition (A) in the tread ring 2 of the airless tire 1, significant effects on steering stability and rolling resistance can be achieved.

The rubber component contains 10-100% by mass of the butadiene rubber (BR) in the 100 parts by mass. When the butadiene rubber (BR) is used by being blended with another rubber, examples of the rubber for the blending include a natural rubber (NR), a styrene butadiene rubber (SBR), an isoprene rubber (IR), a chloroprene rubber (CR), a styrene isoprene butadiene rubber (SIBR), a styrene-isoprene rubber (SIR), an epoxidized natural rubber (ENR), and the like. These rubbers may be used either individually or in combination of two or more. Among these rubbers, NR is preferable for being excellent in low heat generation.

The content rate of the butadiene rubber (BR) is 10% or more by weight, and is preferably 20% or more by weight. When the content rate of the butadiene rubber (BR) is below 10% by weight, there is a tendency that an effect on achieving low heat generation is reduced. Further, when the content rate of the butadiene rubber (BR) is 100% by weight, there is a tendency that strength is reduced. Therefore, an upper limit of the content rate of the butadiene rubber (BR) is preferably 90% or less by weight, and more preferably 80% or less by weight.

As a co-crosslinking agent, the $\alpha$, $\beta$-unsaturated carboxylic acid metal salt is adopted, which is a metal salt of an $\alpha$, $\beta$-unsaturated carboxylic acid such as acrylic acid, methacrylic acid, maleic acid, fumaric acid, or itaconic acid. In particular, for being excellent in durability, an acrylic acid metal salt and/or a methacrylic acid metal salt are preferable, and a methacrylic acid metal salt is even more preferable. Further, examples of the metal in the $\alpha$, $\beta$-unsaturated carboxylic acid metal salt include zinc, sodium, magnesium, calcium, aluminum and the like, among which, zinc is preferred for allowing sufficient hardness to be obtained.

The content of the co-crosslinking agent ($\alpha$, $\beta$-unsaturated carboxylic acid metal salt) is 10-80 parts by weight with respect to 100 parts by weight of the rubber component. When the content of the $\alpha$, $\beta$-unsaturated carboxylic acid metal salt is below 10 parts by weight, a sufficient crosslink density cannot be obtained. Further, when the content of the $\alpha$, $\beta$-unsaturated carboxylic acid metal salt exceeds 80 parts by weight, it becomes too hard and the strength is also reduced. From such a viewpoint, a lower limit of the content of the α, β-unsaturated carboxylic acid metal salt is preferably 12 parts or more by weight, and upper limit of the content of the α, β-unsaturated carboxylic acid metal salt is preferably 50 parts or less by weight and more preferably 35 parts or less by weight.

Examples of the peroxide include benzoyl peroxide, dicumyl peroxide, di-t-butyl peroxide, t-butyl cumyl peroxide, methyl ethyl ketone peroxide, cumene hydroperoxide, 2,5-dimethyl-2,5-di(t-butylperoxy)hexane, 2,5-dimethyl-2,5-di(benzoyl peroxy)hexane, t-butyl peroxy benzene, 2,4-dichlorobenzoyl peroxide, 1,1-di-t-butyl-peroxy-3,3,5-trimethyl cyclohexane, n-butyl-4,4-di-t-butylperoxyvalerate, and the like. These may be used either individually or in combination of two or more. Among these, the dicumyl peroxide is preferable.

It is preferable that the content of the peroxide be 0.1-6.0 parts by weight with respect to 100 parts by weight of the rubber component. When the content of the peroxide is below 0.1 parts by weight, there is a tendency that a sufficient hardness cannot be obtained. Further, when the content of the peroxide exceeds 6 parts by weight, there is a tendency that the crosslink density becomes too high and the strength is reduced. From such a viewpoint, it is more preferable that a lower limit of the content of the peroxide be 0.2 parts or more by weight and an upper limit of the content of the peroxide be 2 parts or less by weight.

The rubber composition (A) may also contain a reinforcing filler. Examples of the reinforcing filler include carbon black, silica, calcium carbonate, clay, talc, alumina, aluminum hydroxide, and the like. However, carbon black is particularly preferred. When the reinforcing filler is contained, the content of the reinforcing filler be 90 parts or less by weight and more preferably 50 parts or less by weight, with respect to 100 parts by weight of the rubber component. When the content of the reinforcing filler exceeds 90 parts by weight, there is risk that excellent low heat generation cannot be achieved.

In addition to the rubber component, the co-crosslinking agent (α, β-unsaturated carboxylic acid metal salt), the peroxide and the reinforcing filler, the rubber composition (A) may also contain compounding agents that are used in tire industry, such as zinc oxide, wax, stearic acid, oil, an anti-aging agent, and a vulcanization accelerator, within ranges such that the effect according to an embodiment of the present invention is not impaired. Since the rubber composition (A) contains the co-crosslinking agent (α, β-unsaturated carboxylic acid metal salt), it is preferable that the rubber composition (A) do not contain a vulcanizing agent such as sulfur or a sulfur compound.

In the rubber composition (A), the butadiene rubber (BR) and the α, β-unsaturated carboxylic acid metal salt co-crosslink with each other with the peroxide as an initiator, and thereby, high elasticity and low heat generation are achieved. In particular, a ratio ($E^*_{30}/\tan \delta_{30}$) between a complex elastic modulus ($E^*_{30}$) (unit: MPa) and a loss tangent ($\tan \delta_{30}$) at 30° C. can be 700 or greater. By using the rubber composition (A) having the ratio ($E^*_{30}/\tan \delta_{30}$) of 700 or greater, the rolling resistance can be reduced while the steering stability can be ensured as a higher level. In this case, it is more preferable that the complex elastic modulus ($E^*_{30}$) be 75 MPa or greater. An upper limit of the ratio ($E^*_{30}/\tan \delta_{30}$) is not particularly limited.

The rubber composition (A) tends to be inferior to a conventional rubber member for a pneumatic tire in extensibility and tensile strength. However, in the case of the sandwich structure in which the reinforcing rubber layer 7 that is formed of the rubber composition (A) is formed between the outer side reinforcing cord layer 5 and the inner side reinforcing cord layer 6, the reinforcing rubber layer 7 becomes a neutral portion on which tension and compression do not act together. Therefore, the problem of extensibility and tensile strength is eliminated. That is, by having the sandwich structure, the advantages of the rubber composition (A) can be brought out while overcoming the disadvantages of the rubber composition (A).

EXAMPLES

Airless tires (tires corresponding to a tire size of 145/70R12) that each form the basic structure of FIGS. 1 and 2 are prototyped, and operation stability and rolling resistance are tested. In Example 5, an outer side reinforcing cord layer and an inner side reinforcing cord layer are adjacent to each other, and a reinforcing rubber layer is formed on a radial direction inner side of the inner side reinforcing cord layer. In each of Comparative Example 1-5 and Example 1-4, a reinforcing rubber layer is formed between an outer side reinforcing cord layer and an inner side reinforcing cord layer.

Specifications of the tires, except the tread ring, are substantially the same. The spoke is formed using a cast molding method using a urethane resin (thermosetting resin), and is integrally formed with the tread ring and the hub. The outer side reinforcing cord layer and the inner side reinforcing cord layer are as follows, and the specifications are the same for each of the tires.

Outer Side Reinforcing Cord Layer

Number of Plies: 2

Reinforcing Cords: Steel Cords

Angle of Cords: (+21 degrees)/(−21 degrees)

Inner Side Reinforcing Cord Layer

Number of Plies: 1

Reinforcing Cords: Steel Cords

Angle of Cords: 0 degree (spiral winding)

In Comparative Example 5, the content of the α, β-unsaturated carboxylic acid metal salt (zinc methacrylate) is too high and thus the rubber becomes too hard and the tread ring cannot be molded by vulcanization. Therefore, the complex elastic modulus ($E^*_{30}$), the loss tangent ($\tan \delta_{30}$), the operation stability and the rolling resistance are not measured.

(1) Operation Stability:

The prototyped tires are mounted on four wheels of a vehicle (small EV; product name: COMS). The vehicle, driven by one person, is run on a tire test course with a dry asphalt road surface. Operation stability is displayed using a 10-point method based on sensory evaluation by the driver. A larger value means a better operation stability.

(2) Rolling Resistance:

A rolling resistance count number ((rolling resistance)/load×$10^4$) that is measured using a rolling resistance testing machine under a condition in which a speed is 40 km/h and a load is 1 kN is displayed as an index with a rolling resistance count number of Comparative Example 1 as 100. A smaller value means a better rolling resistance.

TABLE 1

| | Comparative Example 1 | Comparative Example 2 | Example 1 | Comparative Example 3 | Example 2 | Example 3 | Example 4 | Comparative Example 5 | Example 5 |
|---|---|---|---|---|---|---|---|---|---|
| Reinforcing Rubber Layer | | | | | | | | | |
| Formation Position of Reinforcing Rubber Layer | Between outer side reinforcing cord layer and inner side reinforcing cord layer | | | | | | | On radial direction inner side of inner side reinforcing cord layer | |
| Thickness | 4.0 mm | | | | | | | | |
| Rubber Composition | | | | | | | | | |
| Natural Rubber (NR) | 80 | 100 | 80 | | | | | 0 | |
| Butadiene Rubber (BR) | 20 | 0 | 20 | | | | | 100 | |
| Carbon Black | 40 | | | | 0 | | | | |
| α,β-Unsaturated Carboxylic Acid Metal Salt | 0 | 40 | 40 | 5 | 10 | 40 | 80 | 90 | 40 |
| Peroxide | 0 | | | | 1 | | | | |
| Zinc Oxide | 5 | | | | 0 | | | | |
| Sulfur | 2 | | | | 0 | | | | |
| Vulcanization Accelerator | 1.6 | | | | 0 | | | | |
| Ratio $E^*_{30}/\tan\delta_{30}$ | 200 | 400 | 750 | 330 | 1600 | 3000 | 4000 | *1 | 3000 |
| $E^*_{30}$ (MPa) | 31 | 42 | 80 | 22 | 79 | 150 | 220 | *1 | 150 |
| Operation Stability | 100 | 90 | 105 | 88 | 110 | 120 | 113 | *1 | 110 |
| Rolling Resistance | 100 | 105 | 90 | 110 | 90 | 80 | 75 | *1 | 80 |

*1) The tread ring cannot be molded by vulcanization; the complex elastic modulus ($E^*_{30}$), the loss tangent ($\tan\delta_{30}$), the operation stability and the rolling resistance are not measured.

Materials of the rubber compositions in Table 1 are as follows.
  Natural Rubber (NR): RSS #3
  Butadiene Rubber (BR): BR150B manufactured by Ube Industries, Ltd.
  Carbon Black: Diamond Black E (FEF) manufactured by Mitsubishi Chemical Co., Ltd.
  Zinc Methacrylate (α, β-Unsaturated Carboxylic Acid Metal Salt): Sun-ester SK-3 manufactured by Sanshin Chemical Industry Co., Ltd.
  Peroxide: Percumyl D (dicumyl peroxide) manufactured by NOF Corporation
  Zinc Oxide: Zinc Oxide II manufactured by Mitsui Mining & Smelting Co., Ltd.
  Sulfur: Powered sulfur manufactured by Karuizawa Sulfur Co., Ltd.
  Vulcanization Accelerator: NOCCELER NS (N-tert-butyl-2-benzothiazyl sulfenamide) manufactured by Ouchi Shinko Chemical Industrial Co., Ltd.

As illustrated in Table 1, in the tires of the examples, it can be confirmed that rolling resistance can be reduced while excellent steering stability is ensured.

Second Embodiment

Figure 7:
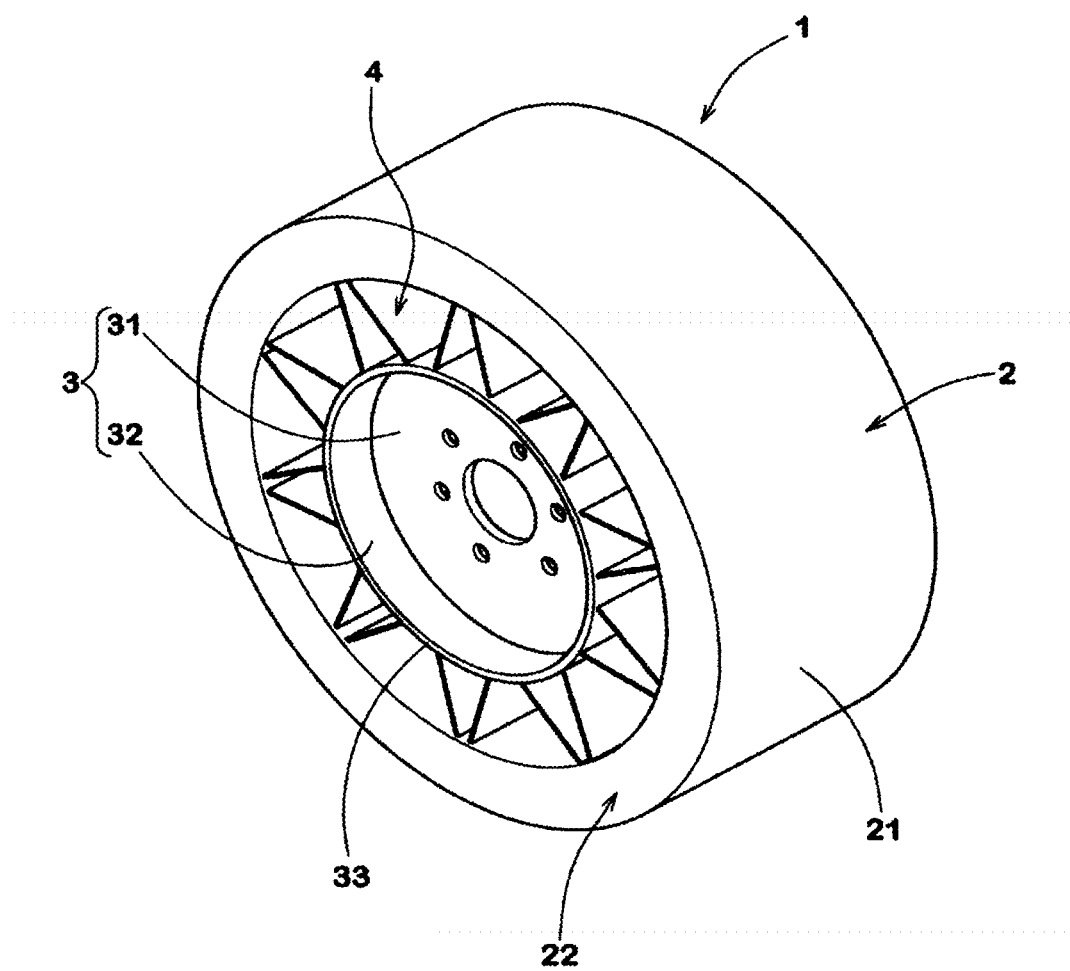
FIG. 7 is a perspective view illustrating an airless tire according to another embodiment of the present invention.

As illustrated in FIG. 7, an airless tire 1 of the present embodiment includes a cylindrical tread ring 2 that has a ground contact surface 21, a hub 3 that is positioned on a radial direction inner side of the tread ring 2 and is fixed to an axle, and a spoke 4 that connects the tread ring 2 and the hub 3. The present embodiment illustrates a case where the airless tire 1 is formed as a passenger car tire.

The hub 3 has a disc part 31 that is fixed to the axle, and a cylindrical part 32 that is formed on an outer periphery of the disc part 31. The hub 3 is formed using a metal material such as steel, aluminum alloy or magnesium alloy.

The spoke 4 is formed by a cast-molded body using a polymer material. The spoke 4 has a plate-like shape. Multiple spokes 4 are provided along a tire circumferential direction.

Figure 8:
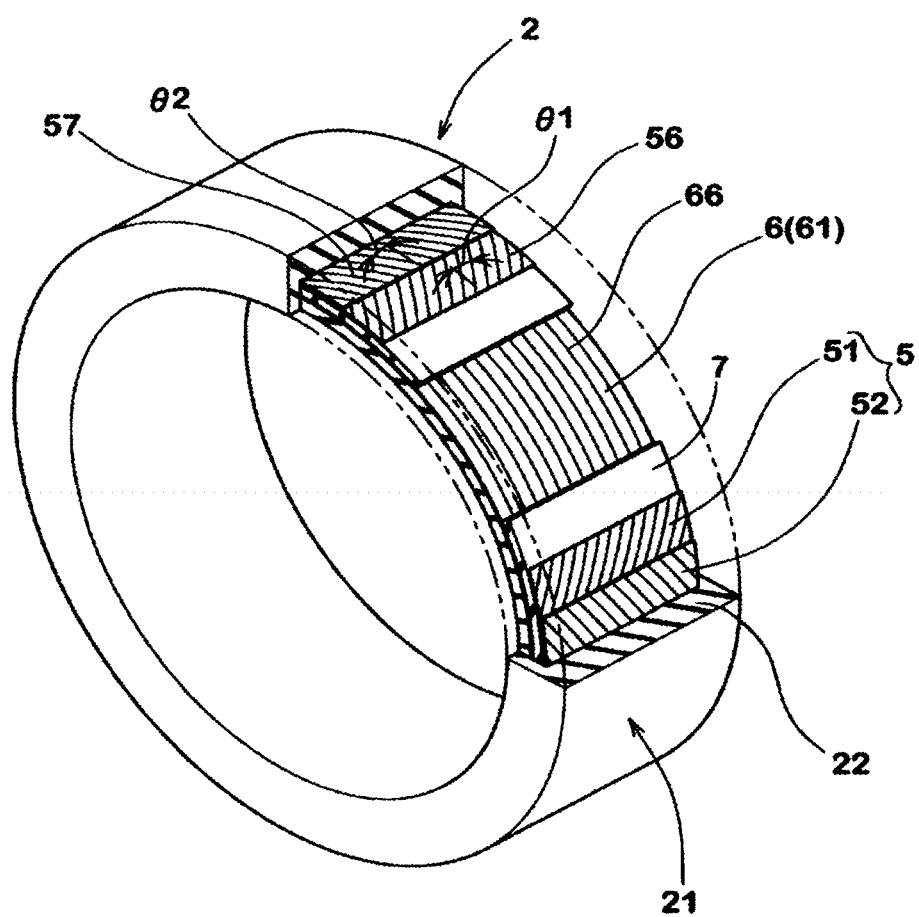
FIG. 8 is a perspective view illustrating a tread ring of FIG. 7.
Figure 9:
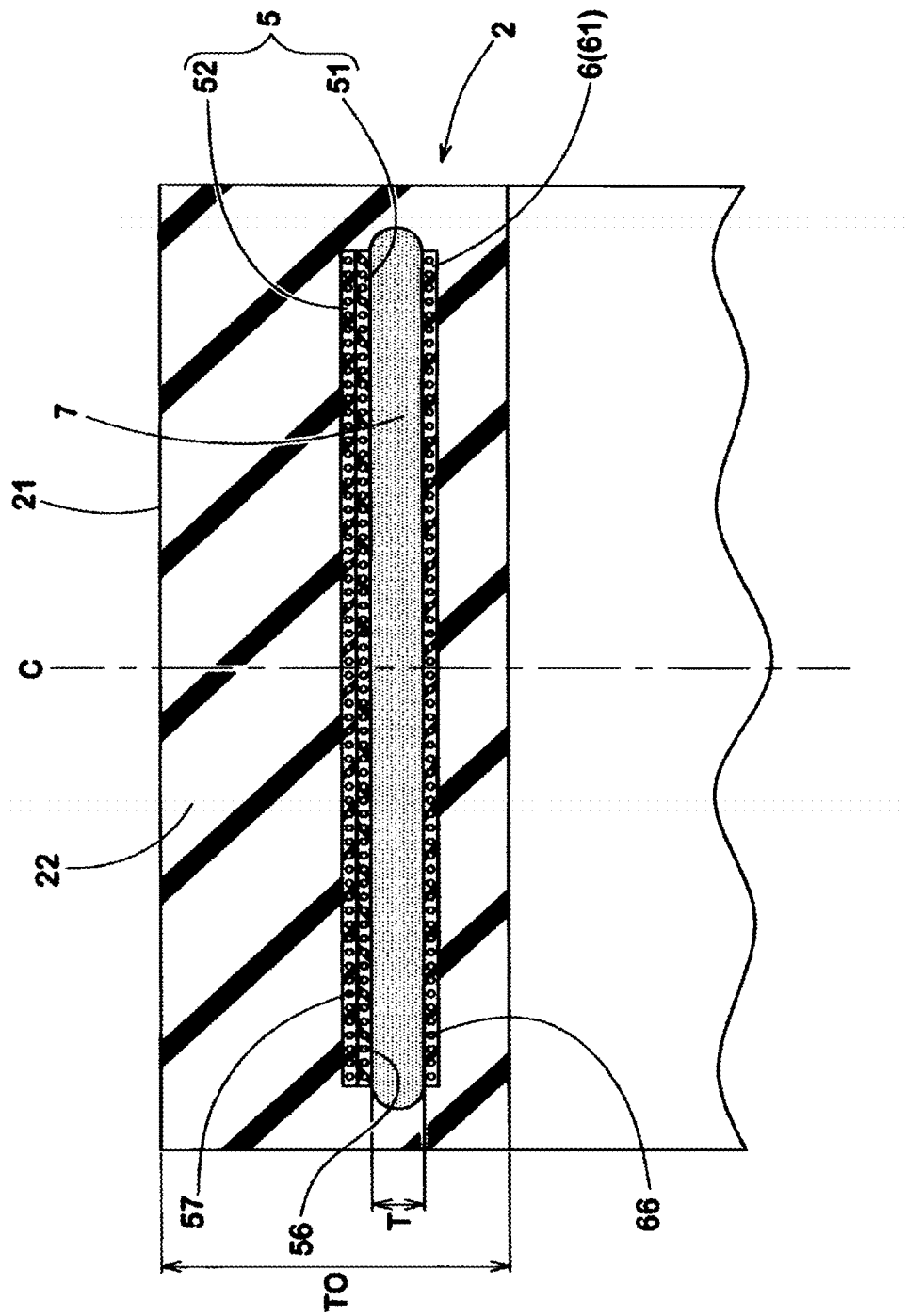
FIG. 9 is a cross-sectional view of the tread ring of FIG. 8.

As illustrated in FIGS. 8 and 9, the tread ring 2 includes a tread rubber layer 22 that forms the ground contact surface 21, and a reinforcing rubber layer 7 that is formed on a tire radial direction inner side of the tread rubber layer 22. In the present embodiment, the tread ring 2 further includes an outer side reinforcing cord layer 5 that is provided closest to the tread rubber layer 22, and an inner side reinforcing cord layer 6 that is provided on a tire radial direction inner side of the outer side reinforcing cord layer 5, and the reinforcing rubber layer 7 is provided between the outer side reinforcing cord layer 5 and the inner side reinforcing cord layer 6. That is, a sandwich structure is formed in which the reinforcing rubber layer 7 is sandwiched on both sides by the outer side reinforcing cord layer 5 and the inner side reinforcing cord layer 6.

On the ground contact surface 21, which is an outer peripheral surface of the tread ring 2, tread grooves (not illustrated in the drawings) are formed in various pattern shapes in order to impart wet performance. A rubber composition that is superior in frictional force and wear resistance with respect to making contact with the ground is preferably adopted for the tread rubber layer 22.

In the present embodiment, the number of layers in the outer side reinforcing cord layer 5 is greater than the number of layers in the inner side reinforcing cord layer 6 on the inner side. Thereby, rigidity of the ground contact surface 21 can be easily increased. Further, on the other hand, the number of layers in the inner side reinforcing cord layer 6 is less than the number of layers in the outer side reinforcing cord layer 5. Thereby, reduction in weight can be easily achieved.

The outer side reinforcing cord layer 5 is structured to include a first cord ply 51 and a second cord ply 52 that is provided on the tire radial direction outer side of the first cord ply 51.

In the present embodiment, in a tire axial direction, a width of the first cord ply 51 and a width of the second cord ply 52 are set substantially equal. "Substantially equal"

includes a case where the width of the first cord ply 51 and the width of the second cord ply 52 are the same and a case where a difference between the widths is 10 mm or less.

Figure 10:
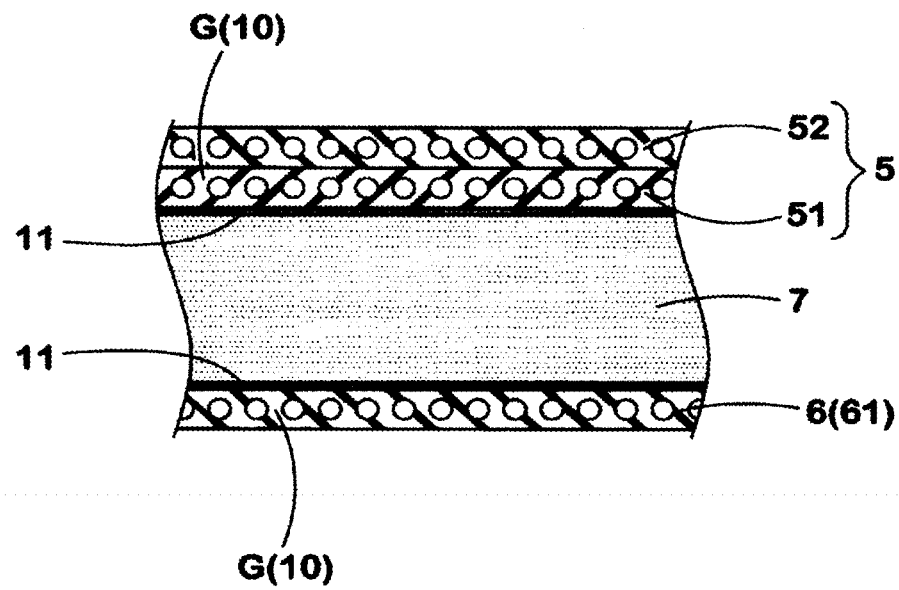
FIG. 10 is a cross-sectional view of an interface layer.

The first cord ply 51 has first reinforcing cords 56 that are arrayed inclined at an angle (θ1) with respect to the tire circumferential direction. The first reinforcing cords 56 are covered by a topping rubber (G) (shown in FIG. 10).

The second cord ply 52 has second reinforcing cords 57 that are arrayed inclined at the same angle (θ2) but in an opposite orientation as the first reinforcing cords 56 with respect to the tire circumferential direction. The second reinforcing cords 57 are covered by a topping rubber.

As the first reinforcing cords 56 and the second reinforcing cords 57, materials same as belt cords of a pneumatic tire, such as steel cords, may be preferably adopted. However, high modulus organic fiber cords such as aramid, polyethylene naphthalate (PEN) and polyethylene terephthalate (PET), having a high strength and a high elastic modulus, may also be used upon request.

The first reinforcing cords 56 and the second reinforcing cords 57 are positioned inclined in mutually opposite orientations with respect to the tire circumferential direction. Thereby, rigidity of the outer side reinforcing cord layer 5 is increased and the tread ring 2 is effectively reinforced. Further, when a slip angle is applied to the airless tire 1, similar to a belt cord reinforcing layer of a pneumatic tire, the outer side reinforcing cord layer 5 exhibits high resistance to an in-plane torsion, and provides excellent turning performance such as generating a cornering power.

The inner side reinforcing cord layer 6 is structured to include a third cord ply 61 that has third reinforcing cords 66. The third reinforcing cords 66 are covered by a topping rubber (G) (illustrated in FIG. 10).

The third reinforcing cords 66 of the present example are arrayed in parallel to the tire circumferential direction. Here, "parallel to the tire circumferential direction" means that the array of the third reinforcing cords 66 is substantially parallel to the tire circumferential direction. Taking into account tolerances in manufacturing, an angle (θ3) (not illustrated in the drawings) of the third reinforcing cords 66 with respect to the tire circumferential direction is, for example, about 0±5 degrees. In the present example, the third reinforcing cords 66 are spirally wound. As the third reinforcing cords 66, for example, steel cords can be preferably adopted. However, high modulus organic fiber cords such as aramid, polyethylene naphthalate (PEN) and polyethylene terephthalate (PET) can also be used upon request.

Due to the third reinforcing cords 66 that are arrayed in the inner side reinforcing cord layer 6, rigidity of the tread ring 2 in the tire circumferential direction is increased. As a result, a shape of the ground contact surface 21 is stable during deceleration and acceleration, and brake performance and traction performance are improved. Further, the third cord ply 61 having the third reinforcing cords 66 that are arrayed in parallel to the tire circumferential direction can ensure symmetry with respect to the tire circumferential direction line while allowing reduction in weight to be achieved by being a single-layer layer.

Next, in the tread ring 2, as illustrated in the enlarged view of FIG. 9, a sandwich structure is formed by the outer side reinforcing cord layer 5, the inner side reinforcing cord layer 6, and the reinforcing rubber layer 7 that is formed between the outer side reinforcing cord layer 5 and the inner side reinforcing cord layer 6. As a result, forces of tension and compression that act when the tread ring 2 is subjected to a load can be supported by the outer side reinforcing cord layer 5 and the inner side reinforcing cord layer 6 on both sides of the reinforcing rubber layer 7, and deformation of the tread ring 2 can be suppressed.

Further, in order to sufficiently enhance the above-described functions to ensure more excellent steering stability and to reduce rolling resistance, the following rubber composition (A) is used for the reinforcing rubber layer 7.

The rubber composition (A) contains 10-80 parts by weight of an α, β-unsaturated carboxylic acid metal salt with respect to 100 parts by mass of a rubber component of which a content rate of a butadiene rubber (BR) is 10-100% by mass, and contains a peroxide. In the rubber composition (A), the butadiene rubber (BR) and the α, β-unsaturated carboxylic acid metal salt co-cross-link with each other with the peroxide as an initiator, and thereby, high elasticity and low heat generation, which are difficult to achieve in a sulfur-vulcanized rubber, are achieved.

The rubber component contains 10-100% by mass of the butadiene rubber (BR) in the 100 parts by mass. When the butadiene rubber (BR) is used by being blended with another rubber, examples of the rubber for the blending include a natural rubber (NR), a styrene butadiene rubber (SBR), an isoprene rubber (IR), a chloroprene rubber (CR), a styrene isoprene butadiene rubber (SIBR), a styrene-isoprene rubber (SIR), an epoxidized natural rubber (ENR), and the like. These rubbers may be used either individually or in combination of two or more. Among these rubbers, NR is preferable for being excellent in low heat generation.

The content rate of the butadiene rubber (BR) is 10% or more by weight, and is preferably 20% or more by weight. When the content rate of the butadiene rubber (BR) is below 10% by weight, there is a tendency that an effect on achieving low heat generation is reduced. Further, when the content rate of the butadiene rubber (BR) is 100% by weight, there is a tendency that strength is reduced. Therefore, an upper limit of the content rate of the butadiene rubber (BR) is preferably 90% or less by weight, and more preferably 80% or less by weight.

As a co-crosslinking agent, the α, β-unsaturated carboxylic acid metal salt is adopted, which is a metal salt of an α, β-unsaturated carboxylic acid such as acrylic acid, methacrylic acid, maleic acid, fumaric acid, or itaconic acid. In particular, for being excellent in durability, an acrylic acid metal salt and/or a methacrylic acid metal salt are preferable, and a methacrylic acid metal salt is even more preferable. Further, examples of the metal in the α, β-unsaturated carboxylic acid metal salt include zinc, sodium, magnesium, calcium, aluminum and the like, among which, zinc is preferred for allowing sufficient hardness to be obtained.

The content of the co-crosslinking agent (α, β-unsaturated carboxylic acid metal salt) is 10-80 parts by weight with respect to 100 parts by weight of the rubber component. When the content of the α, β-unsaturated carboxylic acid metal salt is below 10 parts by weight, a sufficient crosslink density cannot be obtained. Further, when the content of the α, β-unsaturated carboxylic acid metal salt exceeds 80 parts by weight, it becomes too hard and the strength is also reduced. From such a viewpoint, a lower limit of the content of the α, β-unsaturated carboxylic acid metal salt is preferably 12 parts or more by weight, and upper limit of the content of the α, β-unsaturated carboxylic acid metal salt is preferably 50 parts or less by weight and more preferably 35 parts or less by weight.

Examples of the peroxide include benzoyl peroxide, dicumyl peroxide, di-t-butyl peroxide, t-butyl cumyl peroxide, methyl ethyl ketone peroxide, cumene hydroperoxide, 2,5-dimethyl-2,5-di(t-butylperoxy)hexane, 2,5-dimethyl-2,5-di(benzoyl peroxy)hexane, t-butyl peroxy benzene, 2,4- dichlorobenzoyl peroxide, 1,1-di-t-butyl-peroxy-3,3,5-trimethyl cyclohexane, n-butyl-4,4-di-t-butylperoxyvalerate, and the like. These may be used either individually or in combination of two or more. Among these, the dicumyl peroxide is preferable.

It is preferable that the content of the peroxide be 0.1-6.0 parts by weight with respect to 100 parts by weight of the rubber component. When the content of the peroxide is below 0.1 parts by weight, there is a tendency that a sufficient hardness cannot be obtained. Further, when the content of the peroxide exceeds 6 parts by weight, there is a tendency that the crosslink density becomes too high and the strength is reduced. From such a viewpoint, it is more preferable that a lower limit of the content of the peroxide be 0.2 parts or more by weight and an upper limit of the content of the peroxide be 2 parts or less by weight.

The rubber composition (A) may also contain a reinforcing filler. Examples of the reinforcing filler include carbon black, silica, calcium carbonate, clay, talc, alumina, aluminum hydroxide, and the like. However, carbon black is particularly preferred. When the reinforcing filler is contained, the content of the reinforcing filler be 90 parts or less by weight and more preferably 50 parts or less by weight, with respect to 100 parts by weight of the rubber component. When the content of the reinforcing filler exceeds 90 parts by weight, there is risk that excellent low heat generation cannot be achieved.

In addition to the rubber component, the co-crosslinking agent ($\alpha$, $\beta$-unsaturated carboxylic acid metal salt), the peroxide and the reinforcing filler, the rubber composition (A) may also contain compounding agents that are used in tire industry, such as zinc oxide, wax, stearic acid, oil, an anti-aging agent, and a vulcanization accelerator, within ranges such that the effect according to an embodiment of the present invention is not impaired. Since the rubber composition (A) contains the co-crosslinking agent ($\alpha$, $\beta$-unsaturated carboxylic acid metal salt), a vulcanizing agent such as sulfur and a sulfur compound is not contained.

Further, when the rubber composition (A) is used for the reinforcing rubber layer 7, since elasticity or stretching is too different between the reinforcing rubber layer 7 and an adjacent rubber 10 that is adjacent to the reinforcing rubber layer 7, there is a possibility that peeling occurs at an interface between the reinforcing rubber layer 7 and the adjacent rubber 10. Therefore, in the magnified illustration of FIG. 10, at the interface portion between the reinforcing rubber layer 7 and the adjacent rubber 10, an interface layer 11 is formed in which elasticity is gradually reduced from the reinforcing rubber layer 7 toward the adjacent rubber 10. As a result, the elasticity difference between the reinforcing rubber layer 7 and the adjacent rubber 10 can be buffered.

In the case of the present example, the reinforcing rubber layer 7 is adjacent to the topping rubber (G) of each of the outer side reinforcing cord layer 5 and the inner side reinforcing cord layer 6. That is, the topping rubber (G) forms the adjacent rubber 10. Similar to the case of a pneumatic tire, the topping rubber (G) is formed of a sulfur-vulcanized rubber using sulfur as vulcanizing agent. Then, during vulcanization, a portion of the sulfur in the topping rubber (G) migrates to the reinforcing rubber layer 7 side and thereby the interface layer 11, in which the sulfur migrated into the rubber composition (A) is dispersed, is formed in the interface region.

Specifically, when the tread ring 2 is manufactured, a raw tread ring is formed by laminating an unvulcanized inner side reinforcing cord layer 6, an unvulcanized reinforcing rubber layer 7, an unvulcanized outer side reinforcing cord layer 5, an unvulcanized tread rubber layer 22, and the like. Thereafter, the raw tread ring is molded by vulcanization in a mold and thereby the tread ring 2 is formed. During the molding by vulcanization, in the interface portion, a portion of the sulfur contained in an unvulcanized topping rubber (G) (adjacent rubber 10) penetrates into an adjacent unvulcanized rubber composition (A) and the complex interface layer 11 is formed from sulfur composition and peroxide crosslinking.

The interface layer 11 is, compositionally, obtained by adding sulfur to the composition of the rubber composition (A), in which a penetration amount of the sulfur gradually increases toward the topping rubber (G) side. Further, as a physical property of the interface layer 11, an elastic modulus decreases in accordance with the penetration amount of the sulfur with respect to a high elastic modulus of the rubber composition (A). That is, the elasticity in the interface layer 11 gradually decreases toward the topping rubber (G) side so that peeling damage can be suppressed by suppressing stress concentration occurring in the interface portion.

Further, the rubber composition (A) tends to be inferior to the sulfur-vulcanized rubber in extensibility and tensile strength. However, in the present example, a sandwich structure is adopted in which the reinforcing rubber layer 7 formed of the rubber composition (A) is formed between the outer side reinforcing cord layer 5 and the inner side reinforcing cord layer 6. Therefore, the reinforcing rubber layer 7 becomes a neutral portion on which both tension and compression do not act, and the above-described problem of extensibility and tensile strength is eliminated. That is, by adopting the sandwich structure, the advantages of the rubber composition (A) can be effectively brought out while the disadvantages of the rubber composition (A) are overcome.

It is preferable that a thickness (T) (illustrated in FIG. 9) of the reinforcing rubber layer 7 be 3 mm or greater and 70% or less of a thickness (T0) of the tread ring 2. When the thickness (T) is below 3 mm, rigidity of the tread ring 2 is insufficient, causing decrease in steering stability. On the other hand, when the thickness (T) exceeds 70% of the thickness (T0), the rigidity of the tread ring 2 becomes too high so that running performance becomes inappropriate such as that vibration characteristics, turning characteristics and the like deteriorate.

Further, it is preferable that the content of the sulfur in the topping rubber (G) be 0.5-10 phr. When the content is below 0.5 phr, the amount of sulfur migrated is small so that it is difficult to form the interface layer 11 and peeling is likely to occur, causing decrease in durability. On the other hand, when the content exceeds 10 phr, problems occur in rubber workability and rubber properties.

Figure 11:
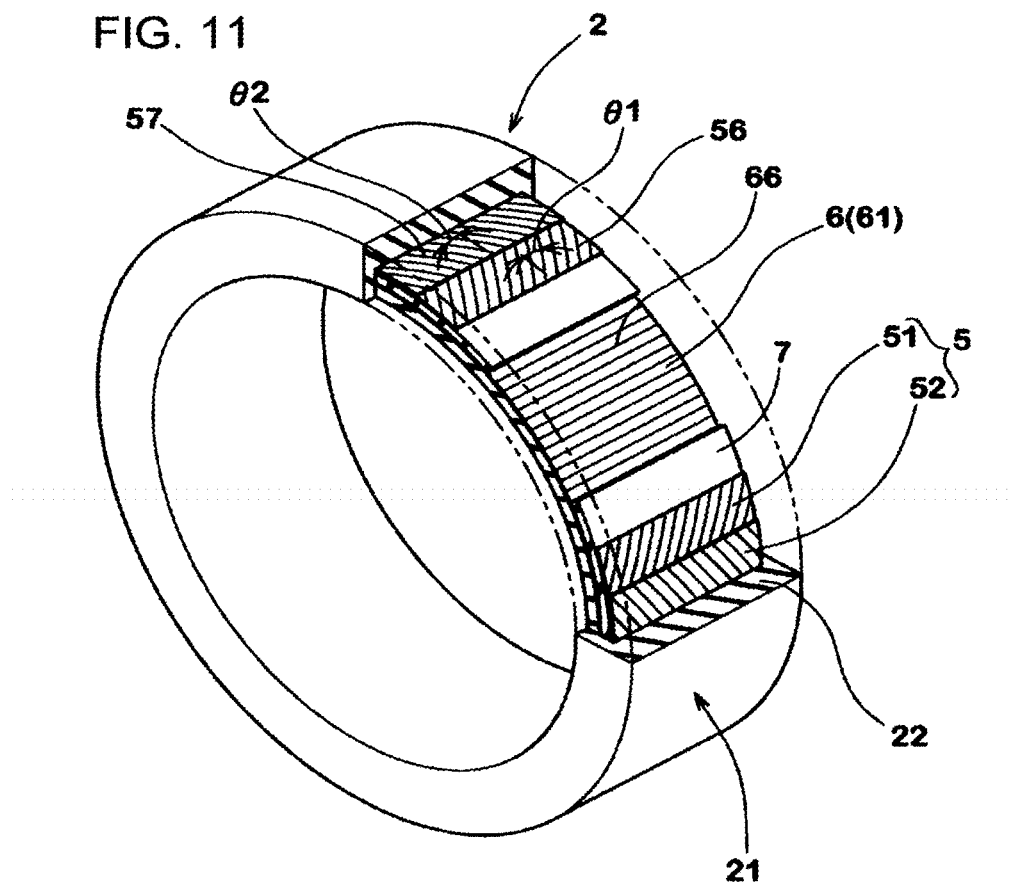
FIG. 11 is a perspective view illustrating an inner side reinforcing cord layer according to a modified embodiment.

Next, an airless tire according to another embodiment of the present invention is described. FIG. 11 illustrates an inner side reinforcing cord layer 6 according to another embodiment of the present invention. In the present example, in the third cord ply 61 that forms the inner side reinforcing cord layer 6, the third reinforcing cords 66 are arrayed in parallel to the tire axial direction. Here, "parallel to the tire axial direction" means that the array of the third reinforcing cords 66 is substantially parallel to the tire axial direction. Taking into account tolerances in manufacturing, an angle ($\theta 3$) (not illustrated in the drawings) of the third reinforcing cords 66 with respect to the tire circumferential direction is, for example, about 90±5 degrees.

When the third reinforcing cords 66 are arrayed in parallel to the tire axial direction, rigidity of the tread ring 2 in the tire axial direction is increased. In this case, when a large slip angle is applied to the airless tire 1, the shape of the ground contact surface 21 is stable. Further, the third cord ply 61 having the third reinforcing cords 66 that are arrayed in parallel to the tire axial direction can ensure the symmetry with respect to a tire circumferential direction line while allowing reduction in weight to be achieved by being a single-layer layer.

Here, for each of the outer side reinforcing cord layer 5 and the inner side reinforcing cord layer 6, the symmetry with respect to the tire circumferential direction line is important. In a case where there is no symmetry, when a load is loaded, due to torsion due to the outer side reinforcing cord layer 5 and the inner side reinforcing cord layer 6, the tread ring 2 deforms by distortion, causing a result that smooth rolling is difficult.

In a pneumatic tire, in order to suppress expansion of a tread part due to internal pressure filling, in general, an angle of belt cords with respect to the tire circumferential direction is limited to a desired range. On the other hand, in the airless tire 1 of the present embodiment, there is no need to consider internal pressure filling. Therefore, the angles ($\theta 1$, $\theta 2$) of the first and second reinforcing cords (56, 57) can be set in a wide range. Specifically, it is desirable that the angles ($\theta 1$, $\theta 2$) be 5-85 degrees. When the angles ($\theta 1$, $\theta 2$) are less than 5 degrees, the rigidity of the tread ring 2 in the tire axial direction is insufficient, and there is a risk that turning performance may be adversely affected. On the other hand, when the angles ($\theta 1$, $\theta 2$) exceed 85 degrees, the rigidity of the tread ring 2 in the tire circumferential direction is insufficient, and there is a risk that straight running performance, or turning performance at a small slip angle, may be adversely affected.

In the present example, a case is illustrated where, in the outer side reinforcing cord layer 5, the first cord ply 51 is formed on the tire radial direction innermost side. However, it is also possible that at least one another cord ply is provided on a further tire radial direction inner side than the first cord ply 51. In the present example, a case is illustrated where, in the outer side reinforcing cord layer 5, the second cord ply 52 is formed on the tire radial direction outermost side. However, it is also possible that at least one another cord ply is provided on a further tire radial direction outer side than the second cord ply 52. Such cord plies reinforce the tread ring 2 and improve load bearing capability of the airless tire 1, and thus are preferably adopted in tires for large loads such as tires for commercial vehicles.

Figure 12:
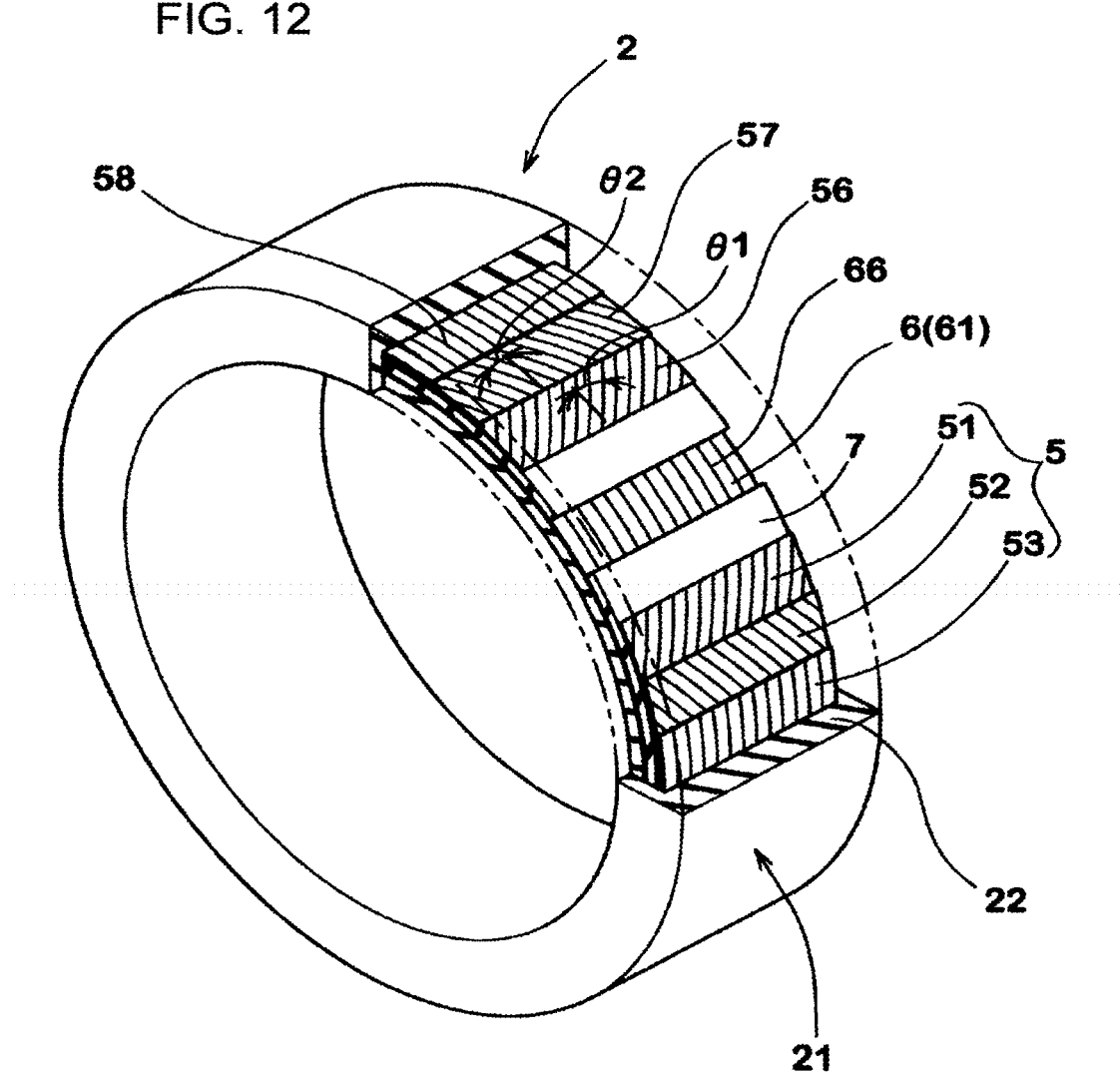
FIG. 12 is a perspective view illustrating an outer side reinforcing cord layer according to a modified embodiment.

Specifically, in an embodiment illustrated in FIG. 12, the outer side reinforcing cord layer 5 is structured to further include a fourth cord ply 53, in which fourth reinforcing cords 58 are arrayed, on a tire radial direction outer side of the second cord ply 52. Other structures that are not described using FIG. 12 are the same as those in the previous embodiment.

The fourth reinforcing cords 58 are arrayed in parallel to the tire circumferential direction (that is, similar to the third reinforcing cords 66, an angle ($\theta 4$) (not illustrated in the drawings) with respect to the tire circumferential direction is 0±5 degrees). Such fourth reinforcing cords 58 increase the rigidity of the tread ring 2 in the tire circumferential direction. As a result, the shape of the ground contact surface 21 is stable during deceleration and acceleration, and brake performance and traction performance are improved.

It is preferable that an elastic modulus (E4) of the fourth reinforcing cords 58 be equal to or less than an elastic modulus (E0) of the first and second reinforcing cords (56, 57). When the elastic modulus (E4) of the fourth reinforcing cords 58 exceeds the elastic modulus (E0), the fourth cord ply 53 becomes a working ply and, when a slip angle is applied to the airless tire 1, a sufficient cornering power cannot be generated and the turning performance is adversely affected. For the fourth reinforcing cords 58, for example, organic fibers such as nylon are preferably adopted.

Figure 13:
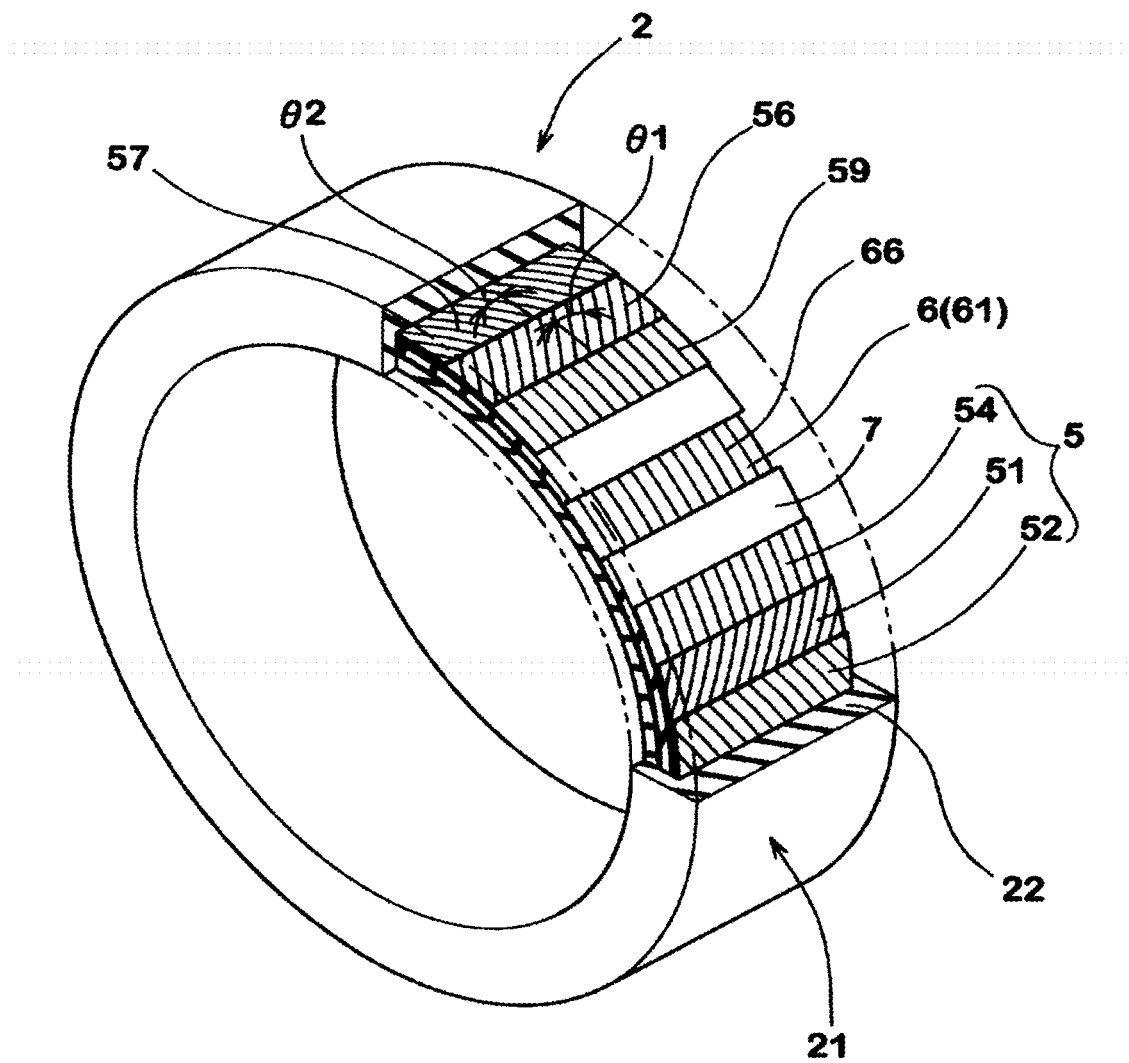
FIG. 13 is a perspective view illustrating an outer side reinforcing cord layer according to another modified embodiment.

FIG. 13 illustrates an outer side reinforcing cord layer 5 according to yet another embodiment of the present invention. Other structures that are not described here are the same as those in the previous embodiment. In the embodiment illustrated in FIG. 13, the outer side reinforcing cord layer 5 is structured to further include a fifth cord ply 54, in which fifth reinforcing cords 59 are arrayed, on the tire radial direction inner side of the first cord ply 51.

The fifth reinforcing cords 59 are arrayed in parallel to the tire circumferential direction (that is, similar to the third reinforcing cords 66, an angle ($\theta 5$) (not illustrated in the drawings) with respect to the tire circumferential direction is 0±5 degrees). Such fifth reinforcing cords 59 increase the rigidity of the tread ring 2 in the tire circumferential direction. As a result, the shape of the ground contact surface 21 is stable during deceleration and acceleration, and brake performance and traction performance are improved.

It is also possible to have a structure in which the embodiment of FIG. 12 and the embodiment of FIG. 13 are combined, that is, in the outer side reinforcing cord layer 5, the fourth cord ply 53 is provided on the tire radial direction outer side of the second cord ply 52, and the fifth cord ply 54 is provided on the tire radial direction inner side of the first cord ply 51.

EXAMPLES

Airless tires (tires corresponding to a tire size of 145/70R12) that each form the basic structure of FIGS. 7 and 8 are prototyped, and steering stability, rolling resistance and durability are tested. In Example 5, an outer side reinforcing cord layer and an inner side reinforcing cord layer are adjacent to each other, and a reinforcing rubber layer is formed on a radial direction inner side of the inner side reinforcing cord layer. In other examples, a reinforcing rubber layer is formed between an outer side reinforcing cord layer and an inner side reinforcing cord layer.

Specifications of the tires, except the tread ring, are substantially the same. The spoke is formed using a cast molding method using a urethane resin (thermosetting resin), and is integrally formed with the tread ring and the hub. The outer side reinforcing cord layer and the inner side reinforcing cord layer are as follows, and the specifications are the same for each of the tires.

Outer Side Reinforcing Cord Layer
Number of Plies: 2
Reinforcing Cords: Steel Cords
Angle of Cords: (+21 degrees)/(−21 degrees)
Inner Side Reinforcing Cord Layer
Number of Plies: 1
Reinforcing Cords: Steel Cords
Angle of Cords: 0 degree (spiral winding)
Tread Ring
Total Thickness (T0): 25 mm In Table 2, rubber compositions of adjacent rubbers (topping rubbers) are the same and a rubber composition (B) illustrated in Table 4 is used. In Table 3, rubber compositions of reinforcing cord layers are the same and a rubber composition (A) illustrated in Table 4 is used.

In Comparative Example 4, when a raw tread ring is formed, the outer side reinforcing cord layer 5 and the inner side reinforcing cord layer 6 are pre-vulcanized in advance, and thereby there is no migration of sulfur from the topping rubber, and the interface layer 11 is not formed.

In Comparative Example 5, the content of the α, β-unsaturated carboxylic acid metal salt (zinc methacrylate) is too high and thus the rubber becomes too hard and the tread ring cannot be molded by vulcanization. Further, in Example 13, the tread ring becomes too hard so that it is not possible to measure steering stability, rolling resistance and durability.

(1) Operation Stability:

The prototyped tires are mounted on four wheels of a vehicle (small EV; product name: COMS). The vehicle, driven by one person, is run on a tire test course with a dry asphalt road surface. Operation stability is displayed using a 10-point method based on sensory evaluation by the driver. A larger value means a better operation stability.

(2) Rolling Resistance:

A rolling resistance count number ((rolling resistance)/load×$10^4$) that is measured using a rolling resistance testing machine under a condition in which a speed is 40 km/h and a load is 1 kN is displayed as an index with a rolling resistance count number of Comparative Example 1 as 100. A smaller value means a better rolling resistance.

(3) Durability

A drum durability testing machine is used and the tire is run under a condition that a speed is 60 km/hr and a load is 1 kN. Based on a running distance until damage occurs to the tread ring, durability is evaluated using an index with durability of Conventional Example 1 as 100. A larger value means a better durability.

TABLE 2

| | Comparative Example 1 | Comparative Example 2 | Example 1 | Comparative Example 3 | Example 2 | Example 3 | Comparative Example 4 | Example 4 | Comparative Example 5 | Example 5 |
|---|---|---|---|---|---|---|---|---|---|---|
| <Reinforcing Rubber Layer> | | | | | | | | | | |
| Formation Position of Reinforcing Rubber Layer | Between outer side reinforcing cord layer and inner side reinforcing cord layer | | | | | | | | | On radial direction inner side of inner side reinforcing cord layer |
| Rubber Composition | | | | | | | | | | |
| Natural Rubber (NR) | 80 | 100 | 80 | | | | 0 | | | |
| Butadiene Rubber (BR) | 20 | 0 | 20 | | | | 100 | | | |
| Carbon Black | 40 | | | | | 0 | | | | |
| α,β-Unsaturated Carboxylic Acid Metal Salt (Zinc Methacrylate) | 0 | 40 | 40 | 5 | 10 | 40 | 40 | 80 | 90 | 40 |
| Peroxide | 0 | | | | | 1 | | | | |
| Sulfur | 3 | | | | | 0 | | | | |
| Vulcanization Accelerator | 1.5 | | | | | 0 | | | | |
| Zinc Oxide | 3 | | | | | 0 | | | | |
| Thickness (T) (Total Thickness (T0) = 25 mm) | | | | | 6.0 mm | | | | | |
| <Adjacent Rubber> | | | | | Rubber Composition (B) (Table 3) | | | | | |
| <Interface Layer> | No | | | Yes | | | No | | Yes | |
| Steering Stability | 100 | 90 | 105 | 88 | 110 | 120 | 120 | 113 | *1 | 110 |
| Rolling Resistance | 100 | 105 | 90 | 110 | 90 | 80 | 80 | 75 | *1 | 80 |
| Durability | 100 | 99 | 99 | 99 | 99 | 99 | 60 | 99 | *1 | 95 |

*1) The tread ring cannot be molded by vulcanization so that measurement is not performed.

TABLE 3

| | Example 6 | Example 7 | Example 8 | Example 9 | Example 10 | Example 11 | Example 12 | Example 13 |
|---|---|---|---|---|---|---|---|---|
| <Reinforcing Rubber Layer> | | | | | | | | |
| Formation Position of Reinforcing Rubber Layer | Between outer side reinforcing cord layer and inner side reinforcing cord layer | | | | | | | |
| Rubber Composition | Rubber Composition (A) (Table 3) | | | | | | | |
| Thickness (T) (Total Thickness (T0) = 25 mm) | 6.0 mm | 6.0 mm | 6.0 mm | 6.0 mm | 1.5 min | 3.0 mm | 10.0 mm | 18.0 mm |

TABLE 3-continued

|  | Example 6 | Example 7 | Example 8 | Example 9 | Example 10 | Example 11 | Example 12 | Example 13 |
|---|---|---|---|---|---|---|---|---|
| <Adjacent Rubber> | | | | | | | | |
| Natural Rubber (NR) | | | | | 80 | | | |
| Butadiene Rubber (BR) | | | | | 20 | | | |
| Carbon Black | | | | | 40 | | | |
| Sulfur | 0.5 | 2 | 8 | 12 | | | 3 | |
| Vulcanization Accelerator | | | | | 1.5 | | | |
| Zinc Oxide | | | | | 3 | | | |
| <Interface Layer> | | | | | Yes | | | |
| Steering Stability | 109 | 118 | 115 | 111 | 105 | 119 | 125 | *2 |
| Rolling Resistance | 75 | 80 | 85 | 103 | 93 | 85 | 70 | *2 |
| Durability | 80 | 102 | 101 | 98 | 101 | 100 | 95 | *2 |

*2) The tread is too hard so that measurement cannot be performed.

TABLE 4

| Rubber Composition | Rubber Composition (A) | Rubber Composition (B) |
|---|---|---|
| Natural Rubber (NR) | 0 | 80 |
| Butadiene Rubber (BR) | 100 | 20 |
| Carbon Black | 0 | 40 |
| α,β-Unsaturated Carboxylic Acid Metal Salt (Zinc Methacrylate) | 40 | 0 |
| Peroxide | 1 | 0 |
| Sulfur | 0 | 3 |
| Vulcanization Accelerator | 0 | 1.5 |
| Zinc Oxide | 0 | 3 |

Materials of the rubber compositions in Table 4 are as follows.

Natural Rubber (NR): RSS #3
Butadiene Rubber (BR): BR150B manufactured by Ube Industries, Ltd.
Carbon Black: Diamond Black E (FEF) manufactured by Mitsubishi Chemical Co., Ltd.
Zinc Methacrylate (α, β-Unsaturated Carboxylic Acid Metal Salt): Sun-ester SK-30 manufactured by Sanshin Chemical Industry Co., Ltd.
Peroxide: Percumyl D (dicumyl peroxide) manufactured by NOF Corporation
Zinc Oxide: Zinc Oxide II manufactured by Mitsui Mining & Smelting Co., Ltd.
Sulfur: Powered sulfur manufactured by Karuizawa Sulfur Co., Ltd.
Vulcanization Accelerator: NOCCELER NS (N-tert-butyl-2-benzothiazyl sulfenamide) manufactured by Ouchi Shinko Chemical Industrial Co., Ltd.

As illustrated in the tables, in the tires of the examples, it can be confirmed that durability can be improved while excellent steering stability can be ensured and rolling resistance can be reduced.

In an airless tire, for a tread rubber layer that forms a ground contact surface of a tread ring, a conventional rubber material for a pneumatic tire may be used, which is advantageous from a viewpoint of strength, durability, operation stability, grip performance and the like. However, in an airless tire, instead of a filling internal pressure in a pneumatic tire, a load or an impact is received by a tread ring or spoke plates. Therefore, a degree of deformation in an airless tire is increased as compared to a pneumatic tire. Therefore, rigidity and heat generation of a composition that forms a tread ring have large influence on rolling resistance and riding comfort.

From such a viewpoint, in addition to a tread rubber layer in a tread ring, a rubber member having higher elasticity and being lower in heat generation than a rubber member used in a pneumatic tire is desired. However, in a conventional rubber material for a pneumatic tire, there is a tendency that, when the rubber material has high elasticity, the rubber material is also high in heat generation, and a significant improvement is difficult.

An airless tire according to an embodiment of the present invention achieves both high elasticity and low fuel consumption at a high level and reduces rolling resistance while ensuring excellent steering stability.

An airless tire according to an embodiment of the present invention includes: a cylindrical tread ring that has a ground contact surface; a hub that is positioned on a radial direction inner side of the tread ring and is fixed to an axle; and a spoke that connects the tread ring and the hub. The tread ring includes a tread rubber layer that forms the ground contact surface, and a reinforcing rubber layer that is formed on a tire radial direction inner side of the tread rubber layer, and the reinforcing rubber layer is formed of a rubber composition that contains 10-80 parts by weight of an α, β-unsaturated carboxylic acid metal salt with respect to 100 parts by mass of a rubber component of which a content rate of butadiene rubber is 10-100% by mass, and contains a peroxide.

In an airless tire according to an embodiment of the present invention, it is preferable that the tread ring further include an outer side reinforcing cord layer that is provided closest to the tread rubber layer, and an inner side reinforcing cord layer that is provided on a tire radial direction inner side of the outer side reinforcing cord layer, and the reinforcing rubber layer be provided between the outer side reinforcing cord layer and the inner side reinforcing cord layer.

In an airless tire according to an embodiment of the present invention, it is preferable that, for the reinforcing rubber layer, a ratio ($E^*_{30}$/tan $\delta_{30}$) between a complex elastic modulus ($E^*_{30}$) (unit: MPa) and a loss tangent (tan $\delta_{30}$) at 30° C. be 700 or greater.

In an airless tire according to an embodiment of the present invention, it is preferable that the outer side reinforcing cord layer include a first cord ply that has first reinforcing cords that are arrayed inclined with respect to a tire circumferential direction, and a second cord ply that is provided on a tire radial direction outer side of the first cord ply and has second reinforcing cords that are arrayed inclined with respect to the tire circumferential direction at an angle same as and in an orientation opposite to the first reinforcing cords, and the inner side reinforcing cord layer include a third cord ply that has third reinforcing cords that are arrayed parallel to the tire circumferential direction or to the tire axial direction.

In the present application, the complex elastic modulus ($E^*_{30}$), and the loss tangent ($\tan \delta_{30}$) are values measured by using a viscoelasticity spectrometer VES (manufactured by Iwamoto Seisakusho Co., Ltd.) at a temperature of 30° C., a frequency of 10 Hz, an initial strain of 10% and a dynamic strain of ±1%.

In an airless tire according to an embodiment of the present invention, as described above, the rubber composition that contains the butadiene rubber, the α, β-unsaturated carboxylic acid metal salt and the peroxide is used for the reinforcing rubber layer of the tread ring. In the rubber composition, the butadiene rubber and the unsaturated carboxylic acid metal salt co-crosslink with each other with the peroxide as an initiator, and thereby, excellent physical properties including high elasticity and low fuel consumption can be obtained. As a result, in the airless tire, rolling resistance can be reduced while ensuring excellent steering stability.

A rubber composition according to an embodiment of the present invention tends to be inferior to a conventional rubber member for a pneumatic tire in extensibility and tensile strength. However, in a case of a so-called sandwich structure in which the reinforcing rubber layer that is formed of the rubber composition is formed between the outer side reinforcing cord layer and the inner side reinforcing cord layer, the problem of extensibility and tensile strength is eliminated.

An airless tire according to another embodiment of the present invention ensures excellent steering stability and reduces rolling resistance by using a butadiene rubber composition that contains an α, β-unsaturated carboxylic acid metal salt as a crosslinking agent for a reinforcing rubber layer of a tread ring and improves durability by suppressing peeling between the reinforcing rubber layer and an adjacent rubber by providing an interface layer that buffers an elasticity difference.

An airless tire according to an embodiment of the present invention includes: a cylindrical tread ring that has a ground contact surface; a hub that is formed on a radial direction inner side of the tread ring and is fixed to an axle; and a spoke that connects the tread ring and the hub. The tread ring includes a tread rubber layer that forms the ground contact surface, and a reinforcing rubber layer that is formed on a tire radial direction inner side of the tread rubber layer. The reinforcing rubber layer is formed of a rubber composition that contains 10-80 parts by weight of an α, β-unsaturated carboxylic acid metal salt with respect to 100 parts by mass of a rubber component of which a content rate of butadiene rubber is 10-100% by mass, and contains a peroxide, and has an interface layer at an interface portion between the reinforcing rubber layer and an adjacent rubber that is adjacent to the reinforcing rubber layer, the interface layer buffering an elasticity difference between the reinforcing rubber layer and the adjacent rubber by gradually reducing elasticity from the reinforcing rubber layer toward the adjacent rubber.

In an airless tire according to an embodiment of the present invention, it is preferable that the tread ring include an outer side reinforcing cord layer that is formed closest to the tread rubber layer and an inner side reinforcing cord layer that is provided on a tire radial direction inner side of the outer side reinforcing cord layer, and the reinforcing rubber layer be formed between the outer side reinforcing cord layer and the inner side reinforcing cord layer, and that a topping rubber of the outer side reinforcing cord layer and the inner side reinforcing cord layer form the adjacent rubber.

In an airless tire according to an embodiment of the present invention, it is preferable that the topping rubber be formed of sulfur-vulcanized rubber using sulfur as a vulcanizing agent, and that the interface layer be formed by allowing a portion of the sulfur in the topping rubber to migrate to the reinforcing rubber layer side during vulcanization.

In an airless tire according to an embodiment of the present invention, it is preferable that a content of the sulfur in the topping rubber be 0.5-10 phr.

In an airless tire according to an embodiment of the present invention, it is preferable that the reinforcing rubber layer have a thickness of 3 mm or greater and 70% or less of a thickness of the tread ring.

In an airless tire according to an embodiment of the present invention, as described above, the rubber composition that contains the butadiene rubber, the α, β-unsaturated carboxylic acid metal salt and the peroxide is used for the reinforcing rubber layer of the tread ring. In the rubber composition, the butadiene rubber and the unsaturated carboxylic acid metal salt co-cross-link with each other with the peroxide as an initiator, and thereby, physical properties excellent in elasticity and low fuel consumption can be obtained. As a result, in the airless tire, rolling resistance can be reduced while excellent steering stability is ensured.

Further, at the interface portion between the reinforcing rubber layer and the adjacent rubber, the interface layer is provided in which elasticity is gradually reduced from the reinforcing rubber layer toward the adjacent rubber. Therefore, stress concentration can be prevented by buffering the elasticity difference between the reinforcing rubber layer and the adjacent rubber, and occurrence of peeling at the interface portion can be suppressed and durability of the tread ring can be improved.

A rubber composition according to an embodiment of the present invention tends to be inferior to a conventional rubber member for a pneumatic tire in extensibility and tensile strength. However, in a case of a so-called sandwich structure in which the reinforcing rubber layer that is formed of the rubber composition is formed between the outer side reinforcing cord layer and the inner side reinforcing cord layer, the problem of extensibility and tensile strength is eliminated.

Obviously, numerous modifications and variations of the present invention are possible in light of the above teachings. It is therefore to be understood that within the scope of the appended claims, the invention may be practiced otherwise than as specifically described herein.

What is claimed is:

1. An airless tire, comprising:
    a tread ring having a cylindrical form and a ground contact surface;
    a hub positioned on a radial direction inner side of the tread ring and configured to be fixed to an axle; and
    a spoke structure formed such that the spoke structure is connecting the tread ring and the hub,
    wherein the tread ring comprises a tread rubber layer forming the ground contact surface, and a reinforcing rubber layer formed on a tire radial direction inner side of the tread rubber layer, and the reinforcing rubber layer is formed of a rubber material obtained by co-crosslinking a rubber composition comprising a rubber component, an α, β-unsaturated carboxylic acid metal salt and a peroxide such that the α, β-unsaturated carboxylic acid metal salt has an amount in a range of 10 parts by weight to 80 parts by weight with respect to 100 parts by mass of the rubber component that the rubber component has a content rate of butadiene rubber in a range of 10% by mass to 100% by mass, and that the reinforcing rubber layer has a ratio $E^*_{30}/\tan \delta_{30}$ of 700 or greater, where $E^*_{30}$ is a complex elastic modulus, and $\tan \delta_{30}$ is a loss tangent at 30° C.

2. The airless tire according to claim 1, wherein the tread ring comprises an outer side reinforcing cord layer formed closest to the tread rubber layer, and an inner side reinforcing cord layer formed on a tire radial direction inner side of the outer side reinforcing cord layer such that the reinforcing rubber layer is positioned between the outer side reinforcing cord layer and the inner side reinforcing cord layer.

3. The airless tire according to claim 1, wherein the tread ring comprises an outer side reinforcing cord layer and an inner side reinforcing cord layer, the outer side reinforcing cord layer comprises a first cord ply comprising a plurality of first reinforcing cords and a second cord ply comprising a plurality of second reinforcing cords such that the first reinforcing cords are arrayed inclined at an angle with respect to a tire circumferential direction, that the second cord ply is formed on a tire radial direction outer side of the first cord ply and that the second reinforcing cords are arrayed inclined at an angle same as the angle of the first reinforcing cords with respect to the tire circumferential direction in an orientation opposite to an orientation of the first reinforcing cords, and the inner side reinforcing cord layer comprises a third cord ply comprising a plurality of third reinforcing cords arrayed parallel to the tire circumferential direction.

4. The airless tire according to claim 1, wherein the tread ring comprises an outer side reinforcing cord layer and an inner side reinforcing cord layer, the outer side reinforcing cord layer comprises a first cord ply comprising a plurality of first reinforcing cords and a second cord ply comprising a plurality of second reinforcing cords such that the first reinforcing cords are arrayed inclined at an angle with respect to a tire circumferential direction, that the second cord ply is formed on a tire radial direction outer side of the first cord ply and that the second reinforcing cords are arrayed inclined at an angle same as the angle of the first reinforcing cords with respect to the tire circumferential direction in an orientation opposite to an orientation of the first reinforcing cords, and the inner side reinforcing cord layer comprises a third cord ply comprising a plurality of third reinforcing cords arrayed parallel to a tire axial direction.

5. The airless tire according to claim 2, wherein the outer side reinforcing cord layer comprises a first cord ply comprising a plurality of first reinforcing cords and a second cord ply comprising a plurality of second reinforcing cords such that the first reinforcing cords are arrayed inclined at an angle with respect to a tire circumferential direction, that the second cord ply is formed on a tire radial direction outer side of the first cord ply and that the second reinforcing cords are arrayed inclined at an angle same as the angle of the first reinforcing cords with respect to the tire circumferential direction in an orientation opposite to an orientation of the first reinforcing cords, and the inner side reinforcing cord layer comprises a third cord ply comprising a plurality of third reinforcing cords arrayed parallel to the tire circumferential direction.

6. The airless tire according to claim 2, wherein the outer side reinforcing cord layer comprises a first cord ply comprising a plurality of first reinforcing cords and a second cord ply comprising a plurality of second reinforcing cords such that the first reinforcing cords are arrayed inclined at an angle with respect to a tire circumferential direction, that the second cord ply is formed on a tire radial direction outer side of the first cord ply and that the second reinforcing cords are arrayed inclined at an angle same as the angle of the first reinforcing cords with respect to the tire circumferential direction in an orientation opposite to an orientation of the first reinforcing cords, and the inner side reinforcing cord layer comprises a third cord ply comprising a plurality of third reinforcing cords arrayed parallel to a tire axial direction.

7. The airless tire according to claim 1, wherein the peroxide comprises dicumyl peroxide, and the α, β-unsaturated carboxylic acid metal salt comprises zinc methacrylate.

8. The airless tire according to claim 1, wherein the rubber component comprises natural rubber and the butadiene rubber, the peroxide comprises dicurnyl peroxide, and the α, β-unsaturated carboxylic acid metal salt comprises zinc methacrylate.

9. The airless tire according to claim 1, wherein the peroxide has a content in a range of 0.1 parts by weight to 6.0 parts by weight with respect to 100 parts by weight of the rubber component.

10. The airless tire according to claim 1, wherein the rubber composition of the rubber material does not contain a vulcanizing agent.

11. The airless tire according to claim 1, wherein the complex elastic modulus $E^*_{30}$ of the reinforcing rubber layer is 75 MPa or greater.

12. The airless tire, according to claim 1, wherein the tread ring comprises an adjacent rubber layer formed adjacent to the reinforcing rubber layer, and an interface layer formed in an interface between the reinforcing rubber layer and the adjacent rubber layer and having elasticity which is reducing from the reinforcing rubber layer toward the adjacent rubber layer such that the interface layer buffers an elasticity difference between the reinforcing rubber layer and the adjacent rubber layer.

13. The airless tire according to claim 12, wherein the tread ring comprises an outer side reinforcing cord layer formed closest to the tread rubber layer, and an inner side reinforcing cord layer formed on a tire radial direction inner side of the outer side reinforcing cord layer such that the reinforcing rubber layer is positioned between the outer side reinforcing cord layer and the inner side reinforcing cord layer, the outer side reinforcing cord layer comprises a topping rubber layer forming an adjacent rubber layer formed adjacent to the reinforcing rubber layer, the inner side reinforcing cord layer comprises a topping rubber layer forming an adjacent rubber layer formed adjacent to the reinforcing rubber layer, and the tread ring comprises a plurality of interface layers formed in interfaces between the reinforcing rubber layer and the adjacent rubber layers, respectively and having elasticity which is reducing from the reinforcing rubber layer toward the adjacent rubber layers such that the interface layers buffer elasticity differences between the reinforcing rubber layer and the adjacent rubber layers, respectively.

14. The airless tire according to claim 13, wherein each of the topping rubber layers is made of a sulfur-vulcanized rubber, and each of the interface layers comprises sulfur migrated from the sulfur-vulcanized rubber in a respective one of the topping rubber layers during vulcanization.

15. The airless tire according to claim 14, wherein each of the topping rubber layers has a sulfur content in a range of from 0.5 phr to 10 phr.

16. The airless tire according to claim 12, wherein the reinforcing rubber layer has a thickness of 3 mm or greater and 70% or less of a thickness of the tread ring.

17. The airless tire according to claim 12, wherein the adjacent lubber layer is made of a sulfur-vulcanized rubber, and the interface layer comprises sulfur migrated from the sulfur-vulcanized rubber in the adjacent rubber layer during vulcanization.

18. The airless tire according to claim 17, wherein the adjacent rubber layer has a sulfur content in a range of from 0.5 phr to 10 phr.

19. The airless tire according to claim 1, wherein the α, β-unsaturated carboxylic acid metal salt has an amount in a range of 40 parts by weight to 80 parts by weight with respect to 100 parts by mass of the rubber component.

20. The airless tire according to claim 1, wherein the rubber component has a content rate of butadiene rubber in a range of 20% by mass to 100% by mass.

\* \* \* \* \*